US009335521B2

(12) United States Patent
Kubota et al.

(10) Patent No.: US 9,335,521 B2
(45) Date of Patent: *May 10, 2016

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/559,955

(22) Filed: Dec. 4, 2014

(65) Prior Publication Data

US 2015/0146307 A1    May 28, 2015

Related U.S. Application Data

(63) Continuation of application No. 13/494,406, filed on Jun. 12, 2012, now Pat. No. 8,988,793.

(30) Foreign Application Priority Data

Jun. 29, 2011 (JP) ................................. 2011-143711

(51) Int. Cl.
*G02B 9/60* (2006.01)
*G02B 13/00* (2006.01)

(52) U.S. Cl.
CPC .............. *G02B 13/0045* (2013.01); *G02B 9/60* (2013.01)

(58) Field of Classification Search
CPC ...... G02B 13/0045; G02B 9/60; G02B 13/18; G02B 3/04; G02B 13/04; G02B 13/0015; G02B 9/64; G02B 13/0085; G02B 13/16; G02B 13/002; G02B 13/006; G02B 13/22; G02B 3/02; G02B 7/08; G02B 13/004; G02B 13/009; G02B 13/06; G02B 17/00
See application file for complete search history.

(56) References Cited

U.S. PATENT DOCUMENTS 7,911,711 B1 * 3/2011 Tang ................... G02B 13/0045
                                                      359/715
8,988,793 B2 * 3/2015 Kubota et al. ................. 359/764

FOREIGN PATENT DOCUMENTS

JP            2007-264180 A    10/2007

* cited by examiner

*Primary Examiner* — James Greece
*Assistant Examiner* — Sharrief Broome
(74) *Attorney, Agent, or Firm* — Kubotera & Associates, LLC

(57) ABSTRACT

An imaging lens includes a first lens having positive refractive power; a second lens having negative refractive power; a third lens having positive refractive power; a fourth lens having negative refractive power; and a fifth lens having object-side and image plane-side surfaces thereof being aspheric, arranged in this order from an object side to an image plane side. The first lens has a shape so that a curvature radius of a surface thereof on the object side is positive. The fifth lens has a shape so that a curvature radius of the surface thereof on the object side and a curvature radius of the surface thereof on the image plane side are positive. The second lens, the third lens, and the fourth lens are arranged so that a specific conditional expression is satisfied.

23 Claims, 18 Drawing Sheets

IMAGING LENS

CROSS-REFERENCE TO RELATED APPLICATIONS

This is a continuation application of a prior application Ser. No. 13/494,406, filed on Jun. 12, 2012, pending, which claims priority of Japanese Patent Application No. 2011-143711, filed on Jun. 29, 2011.

BACKGROUND OF THE INVENTION AND RELATED ART STATEMENT

The present invention relates to an imaging lens for forming an image on an imaging element such as a CCD sensor and a CMOS sensor. More specifically, the present invention relates to an imaging lens that is suitable for mounting on a relatively small camera such as a cellular phone, a digital still camera, a portable information terminal, a security camera, a vehicle onboard camera, and a network camera.

An imaging lens for mounting on a small camera is required not only to be composed of a small number of lenses, but also to have a configuration that can attain high resolution, so as to be compatible with a high-resolution imaging element that has been available in recent years. Conventionally, a three-lens imaging lens configuration has been often used as such an imaging lens. As the resolution of the imaging element has been increased, it is more difficult to achieve satisfactory performance only with the three-lens configuration. In these years, a four-lens configuration or five-lens configuration has being used more frequently.

Among these lens configurations, because of higher design flexibility, the five-lens configuration is expected to be a lens configuration to be used in the next generation imaging lens. As an imaging lens having such the five-lens configuration, for example, an imaging lens described in Patent Reference has been known.

According to Patent Reference, the imaging lens includes in the order from an object side: a first lens that has a convex object side surface and is positive; a second lens that has a shape of a negative meniscus lens directing a concave surface thereof to an image plane side; a third lens that has a shape of positive meniscus lens directing a convex surface thereof to the image plane side; a negative fourth lens that has an aspheric shape on the both sides and has a concave image plane side surface near an optical axis; and a fifth lens that has an aspheric shape on the both sides and is positive or negative.

In the lens configuration, a lower limit of Abbe's number of the first lens, and upper limits of Abbe's numbers of the second and the fourth lenses are set respectively, so as to correct an axial chromatic aberration and a chromatic aberration of magnification and thereby be compatible with high performances of the imaging lens.

Patent Reference: Japanese Patent Publication No. 2007-264180

According to the imaging lens described in Patent Reference, it is possible to attain relatively satisfactory aberrations. Since the total length of the lens system is long, however, it is difficult to attain both miniaturization of the imaging lens and satisfactory aberration correction.

In view of the problems of the conventional techniques described above, an object of the present invention is to provide an imaging lens that can satisfactorily correct aberrations in spite of a small size thereof.

SUMMARY OF THE INVENTION

In order to attain the object described above, according to the present invention, an imaging lens includes a first lens having positive refractive power; a second lens having negative refractive power; a third lens having positive refractive power; a fourth lens having negative refractive power; and a fifth lens having negative refractive power, arranged in this order from an object side to an image plane side. The first lens is formed in a shape so that a curvature radius on an object side surface thereof is positive, the second lens is formed in a shape so that a curvature radius of an object side surface thereof and a curvature radius of an image side surface thereof are both positive, the third lens is formed in a shape so that a curvature radius of an object side surface thereof is positive, and the fifth lens is formed in a shape so that a curvature radius of an object side surface thereof and a curvature radius of an image side surface thereof are both positive.

In the configuration, when the first lens has a focal length f1, the second lens has a focal length f2, the third lens has a focal length f3, the fourth lens has a focal length f4, and the fifth lens has a focal length f5, the imaging lens satisfies the following conditional expressions (1) and (2):

$$f1 < f3 \text{ and } |f2| < f3 \tag{1}$$

$$f3 < |f4| \text{ and } |f2| < |f5| \tag{2}$$

When the imaging lens satisfies the conditional expressions (1) and (2), it is possible to satisfactorily correct aberrations while attaining miniaturization of the imaging lens. In case of the imaging lens having the above-described configuration, since the first lens and the second lens have strong refractive power in relative to those of the other three lenses, the refractive power of the whole lens system in focused on the object side.

Therefore, it is possible to somewhat compress the total optical length while securing a certain imaging angle of view. In addition, according to the invention, the respective lenses of the third lens to the fifth lens have relatively weak refractive, powers. Aberrations generated in the first lens and the second lens, which have strong refractive powers, are suitably corrected through those third to fifth lenses, which have weak refractive powers.

Here, the relation between the focal length of the second lens and the focal length of the third lens, and the relation between the focal length of the second lens and the focal length of the fifth lens preferably satisfy the following conditional expressions:

$$3 \times |f2| < f3 \text{ and } 3 \times |f2| < |f5| \tag{3}$$

In the imaging lens having the above-described configuration, it is preferred to form the fourth lens in a shape so that a curvature radius of an object side surface thereof and a curvature radius of the image side surface thereof are both negative.

As described above, the second lens is formed in a shape so that the curvature radius of the object side surface thereof and the curvature radius of the image side surface thereof are both positive, i.e. a shape of a meniscus lens directing a convex surface thereof to the object side. When the fourth lens is formed in a shape so that a curvature radius of an object side surface thereof and a curvature radius of an image side surface thereof are both negative, i.e., a shape of a meniscus lens directing a concave surface thereof to the object side, the second and the fourth lens are arranged both directing their concave surfaces to the third lens. For this reason, aberrations generated in the first lens are suitably corrected also by the negative-positive-negative arrangement of refractive powers of the second lens to the fourth lens, and the shapes of the respective lens surfaces of second and fourth lenses.

When the first lens has Abbe's number vd1, the second lens has Abbe's number vd2, the third lens has Abbe's number vd3, the fourth lens has Abbe's number vd4, and the fifth lens has Abbe's number vd5, the imaging lens having the above-described configuration preferably satisfies the following conditional expressions (4) to (8):

$$45 < vd1 < 85 \quad (4)$$

$$vd1 < 35 \quad (5)$$

$$45 < vd3 < 85 \quad (6)$$

$$vd4 < 35 \quad (7)$$

$$45 < vd5 < 85 \quad (8)$$

When the imaging lens satisfies the conditional expressions (4) to (8), it is possible to satisfactorily correct axial chromatic aberration and an off-axis chromatic aberration of magnification. According to the conditional expressions (4) to (8), the second lens and the fourth lens are made of a high-dispersion material, and the first lens, third lens, and the fifth lens are made of a low-dispersion material. Accordingly, in the imaging lens of the invention, since a high-dispersion material and a low-dispersion material are alternately disposed, the axial chromatic aberration and the off-axis chromatic aberration of magnification are suitably corrected.

When the whole lens system has a focal length f and the second lens has the focal length f2, the imaging lens having the above-described configuration preferably satisfies the following conditional expression (9):

$$-1.5 < f2/f < -0.4 \quad (9)$$

When the imaging lens satisfies the conditional expression (9), it is possible to restrain the chromatic aberrations and a field curvature within preferred ranges. When the value exceeds the upper limit "−0.4", the second lens has strong refractive power in relative to that of the whole lens system, so that the axial and the off-axis chromatic aberrations are excessively corrected (that of a short wavelength increases in the positive direction in relative to that of a reference wavelength). In addition, the image-forming surface curves to the image plane side, and it is difficult to obtain satisfactory image-forming performance.

On the other hand, when the value is below the lower limit "−1.5", the second lens has weak refractive power in relative to that of the whole lens system, so that the axial and off-axis chromatic aberrations are insufficiently corrected (that of a short wavelength increases in the negative direction in relative to that of a reference wavelength). Moreover, the image-forming surface curves to the object side, and it is difficult to obtain satisfactory image-forming performance also in this case.

When the first lens has the focal length f1 and the second lens has the focal length f2, the imaging lens having the above-described configuration preferably satisfies the following conditional expression (10):

$$-1.0 < f1/f2 < -0.5 \quad (10)$$

When the imaging lens satisfies the conditional expression (10), it is possible to restrain an astigmatism, a field curvature, and a chromatic aberration within preferred ranges in a balanced manner, while restraining a Petzval sum of the whole lens system near zero. When the value exceeds the upper limit "−0.5", the first lens has strong refractive power in relative to that of the second lens, so that the axial and the off-axis chromatic aberrations are insufficiently corrected. As for the astigmatism, a tangential image surface tilts in the negative direction and the astigmatic difference increases. For this reason, it is difficult to obtain satisfactory image-forming performance.

On the other hand, when the value is below the lower limit "−1.0", the first lens has weak refractive power in relative to that of the second lens, so that negative refractive power is strong and the axial and the off-axis chromatic aberrations are excessively corrected. In addition, the image-forming surface curves towards the image plane side. As for the astigmatism, the tangential image surface tilts in the positive direction and the astigmatic difference increases. Therefore also in this case, it is difficult to obtain satisfactory image-forming performance.

When a curvature radius of an object side surface of the second lens is R2f and a curvature radius of an image side surface thereof is R2r, the imaging lens having the above-described configuration preferably satisfies the following conditional expression (11):

$$3.0 < R2f/R2r < 6.0 \quad (11)$$

When the imaging lens satisfies the conditional expression (11), it is possible to restrain a coma aberration, field curvature, and chromatic aberrations within preferred ranges, respectively. When the value exceeds the upper limit "6.0", the second lens has relatively strong refractive power, an outer coma aberration of an off-axis light beam increases, and the axial and the off-axis chromatic aberrations are excessively corrected. In addition, since the image-forming surface curves to the image plane side, it is difficult to obtain satisfactory image-forming performance.

On the other hand, when the value is below the lower limit "3.0", the second lens has relatively weak refractive power, and the axial and the off-axis chromatic aberrations are insufficiently corrected. In addition, since the image-forming surface curves to the object side, it is difficult to obtain satisfactory image-forming performance also in this case.

When the whole lens system has the focal length f and the third lens has the focal length f3, the imaging lens having the above-described configuration preferably satisfies the following conditional expression (12):

$$3.0 < f3/f < 7.0 \quad (12)$$

As described above, according to the imaging lens of the invention, the third lens mainly works for correcting aberrations. When the imaging lens satisfies the conditional expression (12), it is possible to satisfactorily correct aberrations while attaining miniaturization of the imaging lens. When the value exceeds the upper limit "7.0", the third lens has weak refractive power in comparison with that of the whole lens system, and it is difficult to attain miniaturization of the imaging lens.

Here, when the third lens has weak refractive power, it is possible to attain miniaturization of the imaging lens by increasing the refractive power of the fourth lens or the fifth lens. In this case, however, it is difficult to correct aberrations (especially correction of the coma aberration), it is difficult to obtain satisfactory image-forming performance. On the other hand, when the value is below the lower limit "3.0", although such low value is advantageous for miniaturization of the imaging lens, the coma aberration increases and the astigmatic difference also increases. Therefore, also in this case, it is difficult to obtain satisfactory image-forming performance.

When the maximum effective diameter of the object side surface of the third lens is $\phi_{3A}$, the maximum effective diameter of the image side surface thereof is $\phi_{3B}$, maximum effective diameter of the object side surface of the fourth lens is $\phi_{4A}$, maximum effective diameter of the image side surface thereof is $\phi_{4B}$, and an absolute value of the maximum sag in the range that is up to the 70% value of the maximum effective diameters $\phi_{3A}$ to $\phi_{4B}$ of those surfaces is $Z_{0.7}$, the imaging lens having the above-described configuration preferably satisfies the following conditional expression (13):

$$Z_{0.7}/f<0.1 \tag{13}$$

As described above, when the maximum sag is restrained within a certain range, the third lens and the fourth lens have substantially uniform thicknesses in an optical axis direction and have less curved shapes. According to such third lens and fourth lens, it is possible to restrain generation of aberrations of complicated shapes and to satisfactorily correct aberrations generated in the first lens and the second lens. In addition, it is also possible to decrease sensitivity to deterioration of image-forming performance due to de-centering (imperfect alignment), tilting, and the like, which occur upon production of the imaging lens, i.e., sensitivity to production errors.

Moreover, since the thicknesses in the optical axis direction are substantially uniform, it is possible to improve fabrication performance upon production and restrain the manufacturing cost of the imaging lens. Here, "sag" means a distance from a tangential plane of each surface, which is orthogonal to the optical axis, to the surface in a direction parallel to the optical axis.

When the whole lens system has the focal length f and a composite focal length of the third lens and the fourth lens is f34, the imaging lens having the above-described configuration preferably satisfies the following conditional expression (14):

$$2.0<f34/f<10.0 \tag{14}$$

When a ratio of the composite focal length of the third lens and the fourth lens to the focal length of the whole lens system is restrained within the range defined by the conditional expression (14), it is possible to more satisfactorily correct aberrations. When the value exceeds the upper limit "10.0", the composite refractive power of the third lens and the fourth lens is relatively weak and it is difficult to restrain aberrations within preferred ranges in a balanced manner. On the other hand, when the value is below the lower limit "2.0", the composite refractive power of the third lens and the fourth lens is relatively strong, so that it is advantageous for correcting a distortion, but the astigmatic difference increases and it is difficult to obtain satisfactory image-forming performance.

When a distance on the optical axis from the image side surface of the second lens to the object side surface of the third lens is dA and a distance on the optical axis from the image side surface of the third lens to the object side surface of the fourth lens is dB, the imaging lens having the above-described configuration preferably satisfies the following conditional expression (15):

$$0.3<dA/dB<2.0 \tag{15}$$

As well known in the art, there is a limit in an incident angle of a light beam that an imaging element such as a CCD sensor and a CMOS sensor can take, in view of an imaging element structure. When an exit angle of an off-axis light beam is outside the range, light beams outside the range are not taken by the sensor, which results in a so-called "shading phenomenon". More specifically, an image taken through the imaging lens may have a dark portion on periphery thereof in relative to a center portion.

When the imaging lens satisfies the conditional expression (15), it is possible to keep the maximum exit angle of the off-axis light beam small while attaining miniaturization of the imaging lens. When the value exceeds the upper limit "2.0", although it is easy to keep the maximum exit angle of the off-axis light beam small, it is difficult to attain miniaturization of the imaging lens. On the other hand, when the value is below the lower limit "0.3", although it is advantageous for miniaturization of the imaging lens, a chromatic aberration is insufficiently corrected and it is difficult to obtain satisfactory imaging performance. In addition, the maximum exit angle of the off-axis light beam increases and thereby the shading phenomenon easily occurs.

According to the imaging lens of the invention, it is possible to attain both miniaturization of the imaging lens and satisfactory aberration correction, and to provide a small imaging lens with satisfactorily corrected aberrations.

DETAILED DESCRIPTION OF PREFERRED EMBODIMENTS

Hereunder, referring to the accompanying drawings, preferred embodiments of the present invention will be fully described.

FIGS. 1, 4, 7, 10, 13, and 16 are sectional views of imaging lenses in Numerical Data Examples 1 to 6 according to the embodiment, respectively. Since a basic lens configuration is the same among the Numerical Data Examples, the lens configuration of the embodiment will be described with reference to the sectional view of Numerical Data Example 1.

Figure 1:
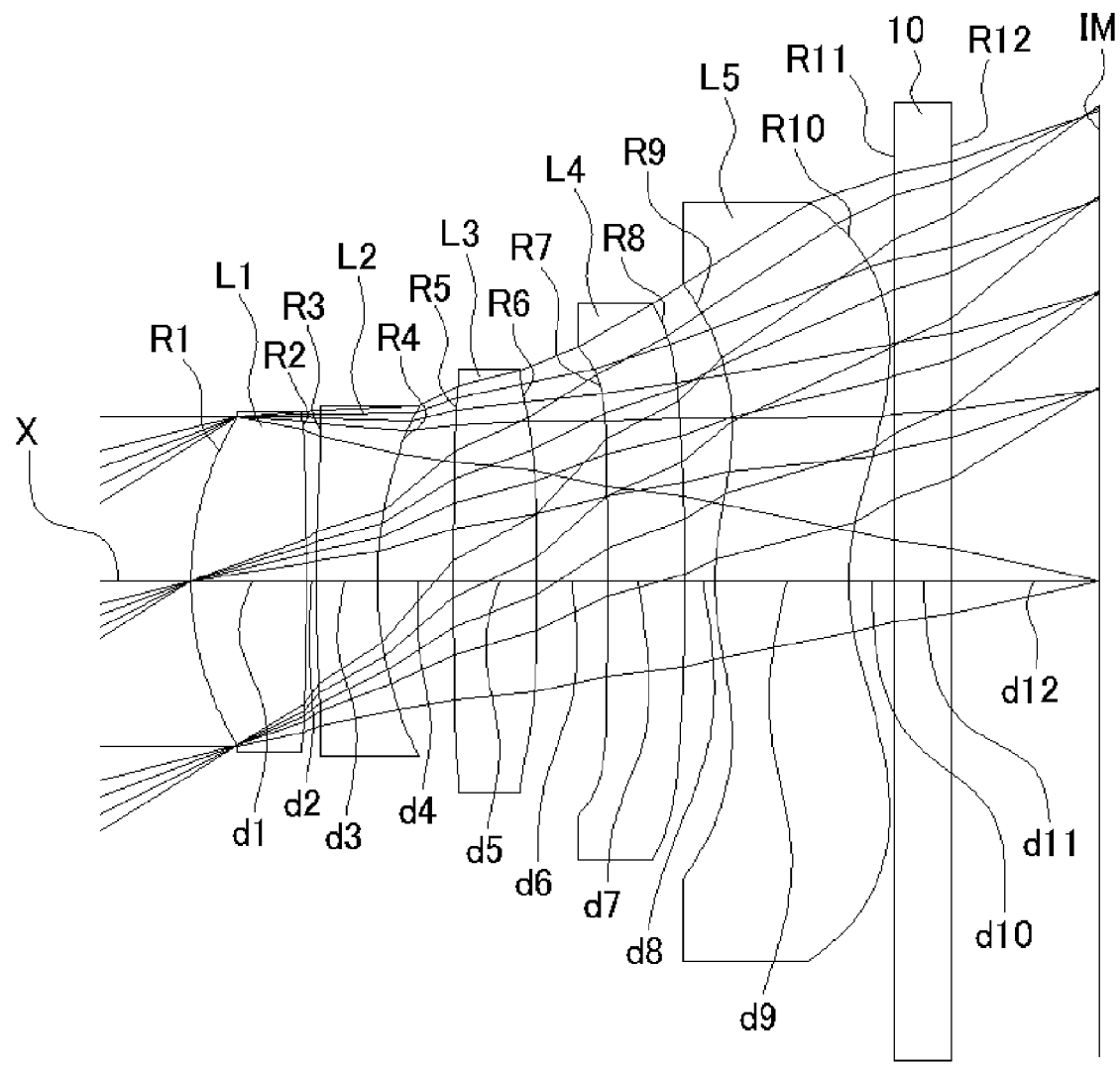
FIG. 1 is a schematic sectional view showing a configuration of an imaging lens in Numerical Data Example 1 according to an embodiment of the invention.

As shown in FIG. 1, the imaging lens of this embodiment includes a first lens L1 having positive refractive power; a second lens L2 having negative refractive power; a third lens L3 having positive refractive power; a fourth lens L4 having negative refractive power; and a fifth lens L5 having negative refractive power, arranged in this order from an object side to an image plane side. A filter 10 such as an infrared cut-off filter and a cover glass is provided between the fifth lens L5 and the image plane IM. The filter 10 may be also optionally omitted. Here, in the imaging lens of this embodiment, there is an aperture stop provided on an object side surface of the first lens L1.

Each lens of the first lens L1 to the fifth lens L5 satisfies the following conditional expressions (1) and (2):

$$f1 < f3 \text{ and } |f2| < f3 \tag{1}$$

$$f3 < |f4| \text{ and } |f2| < |f5| \tag{2}$$

In the above-conditional expressions,
f1: Focal length of the first lens L1
f2: Focal length of the second lens L2
f3: Focal length of the third lens L3
f4: Focal length of the fourth lens L4
f5: Focal length of the fifth lens L5

As described above, in the imaging lens of this embodiment, the refractive powers of the first lens L1 and the second lens L2 are stronger than those of the other three lenses, and the refractive power of the whole lens system is focused on the object side. With this configuration, it is possible to attain miniaturization of the imaging lens and suitably correct aberrations generated in the first lens L1 and the second lens L2 through the respective lenses from the third lens L3 to the fifth lens L5, which have weak refractive powers. Here, the imaging lens of this embodiment satisfies the following conditional expression (3) in addition to the above-described conditional expressions (1) and (2):

$$3 \times |f2| < f3 \text{ and } 3 \times |f2| < |f5| \tag{3}$$

Furthermore, the imaging lens of this embodiment satisfies the following conditional expressions (4) to (8):

$$45 < vd1 < 85 \tag{4}$$

$$vd2 < 35 \tag{5}$$

$$45 < vd3 < 85 \tag{6}$$

$$vd4 < 35 \tag{7}$$

$$45 < vd5 < 85 \tag{8}$$

In the above-conditional expressions,
vd1: Abbe's number of the first lens L1
vd2: Abbe's number of the second lens L2
vd3: Abbe's number of the third lens L3
vd4: Abbe's number or the fourth lens L4
vd5: Abbe's number of the fifth lens L5

As shown in the conditional expressions (4) to (8), in the imaging lens of the embodiment, a high-dispersion material and a low-dispersion material are alternately used in combination. When the Abbe's number of each lens is restrained within the range defined by the conditional expressions (4) to (8), it is possible to satisfactorily correct an axial chromatic aberration and an off-axis chromatic aberration of magnification.

According to the imaging lens having the above-described configuration, the first lens L1 is formed in a shape so that a curvature radius R1 of an object side surface thereof is positive and a curvature radius R2 of an image side surface thereof is negative, i.e. a shape of a biconvex lens near an optical axis X. Here, the shape of the first lens L1 is not limited to such shape of a biconvex lens near the optical axis X. The first lens L1 can have any shape as long as the curvature radius R1 of the object side surface thereof is positive, and can be formed in a shape so that the curvature radii R1 and R2 are both positive, i.e. a shape of a meniscus lens directing a convex surface thereof to the object side near the optical axis X.

The second lens L2 is formed in a shape so that a curvature radius R3 of an object side surface thereof and a curvature radius R4 of an image side surface thereof are both positive so as to have a shape of a meniscus lens directing a convex surface thereof to the object side near the optical axis X. In addition, the second lens L2 is formed so as to satisfy the following conditional expressions (9) and (11). The second lens L2 and the first lens L1 are lenses having strong refractive powers among the lenses in the lens system. According to this embodiment, the first lens L1 and the second lens L2 satisfy the following conditional expression (10). When the imaging lens of the embodiment satisfies the conditional expression (10), it is possible to restrain the Petzval sum of the whole lens system near zero and restrain an astigmatism, field curvature, and chromatic aberration within preferred ranges in a balanced manner.

$$-1.5 < f2/f < -0.4 \tag{9}$$

$$-1.0 < f1/f2 < -0.5 \tag{10}$$

$$3.0 < R2f/R2r < 6.0 \tag{11}$$

In the above-conditional expressions,
R2f: Curvature radius of an object side surface of the second lens L2
R2r: Curvature radius of an image side surface of the second lens L2

In order to more satisfactorily correct aberrations, the imaging lens preferably further satisfies the following conditional expression (10A). The imaging lenses of Numerical Data Examples 1, 5, and 6 satisfy the following conditional expression (10A):

$$-0.7 < f1/f2 < -0.5 \tag{10A}$$

The third lens L3 is formed in a shape so that a curvature radius R5 of an object side surface and a curvature radius R6 of an image side surface are both positive, so as to have a shape of a meniscus lens directing a convex surface to the object side near the optical axis X. The shape of the third lens L3 is not limited to the shape of a meniscus lens directing a convex surface thereof to the object side near the optical axis X. The third lens L3 can have any shape as long as the curvature radius R5 of the object side surface is positive and can have a shape of a biconvex lens near the optical axis X. Numerical Data Examples 1 to 5 show examples, in which the third lens L3 has a shape of a meniscus lens directing a convex surface thereof to the object side near the optical axis X, and Numerical Data Example 6 shows an example, in which the third lens L3 has a shape of a biconvex lens near the optical axis X.

The third lens L3 satisfies the following conditional expression (12). With this configuration, it is possible to more satisfactorily correct aberrations. In order to more satisfactorily correct aberrations, it is preferred to further satisfy the following conditional expression (12A). The imaging lenses according to Numerical Data Example 1 and Numerical Data Example 3 to 6 satisfy the conditional expression (12A):

$$3.0 < f3/f < 7.0 \tag{12}$$

$$4.0 < f3/f < 7.0 \tag{12A}$$

The fourth lens L4 is formed in a shape so that a curvature radius R7 of an object side surface and a curvature radius R8 of an image side surface are both negative, i.e. a shape of a meniscus lens directing a concave surface to the object side near the optical axis X. As described above, since the second lens L2 is formed in a shape of a meniscus lens directing a convex surface to the object side near the optical axis X, when the fourth lens L4 is formed in a shape of a meniscus lens directing a concave surface to the object side near the optical axis X, the second lens L2 and the fourth lens L4 are arranged both directing their concave surfaces to the third lens L3. For this reason, aberrations generated in the first lens L1 are suitably corrected by the negative-positive-negative arrangement of refractive powers of the second lens L2 to the fourth lens L4 and the shapes of the respective lens surfaces of the second lens L2 and the fourth lens L4.

The third lens L3 and the fourth lens L4 mainly work for correcting aberrations. The imaging lens of the embodiment satisfactorily corrects aberrations by restraining the sag of each lens surface of the third lens L3 and the fourth lens L4 within a certain range. More specifically, when the maximum effective diameter of the object side surface of the third lens L3 is $\phi_{3A}$, the maximum effective diameter of the image side surface thereof is $\phi_{3B}$, the maximum effective diameter of the object side surface of the fourth lens L4 is $\phi_{4A}$, the maximum effective diameter of the image side surface thereof is $\phi_{4B}$, and the absolute value of the maximum sag in the range that is up to 70% value of the maximum effective diameters $\phi_{3A}$ to $\phi_{4B}$ is $Z_{0.7}$, the imaging lens preferably satisfies the following conditional expression (13):

$$Z_{0.7}/f < 0.1 \tag{13}$$

Restraining the maximum sag within the range defined by the conditional expression (13), the third lens L3 and the fourth lens L4 have substantially uniform thicknesses in a direction of the optical axis X and have less curved shapes. With such lens shapes, it is possible to more satisfactorily correct aberrations. In addition, it is also possible to effectively decrease the sensitivity to deterioration of image-forming performance due to de-centering (imperfect alignment), tilting, or the like, which is generated upon production of the imaging lens, i.e. so-called "production error sensitivity". Moreover, with substantially uniform thicknesses in the direction of the optical axis X, it is possible to improve the fabrication performance upon production and thereby restrain the manufacturing cost of the imaging lens. Here, the sag refers to a distance from a tangential plane of each surface, which is orthogonal to the optical axis X, to the surface in a direction parallel to the optical axis X.

Here, each lens from the second lens L2 to the fourth lens L4 satisfies the following conditional expressions (14) and (15). With this configuration, it is possible to more satisfactorily correct aberrations. In addition, the maximum exit angle of the off-axis light beam is kept small and generation of the shading phenomenon is restrained.

$$2.0 < f34/f < 10.0 \tag{14}$$

$$0.3 < dA/dB < 2.0 \tag{15}$$

In the above-conditional expressions, f34: Composite focal length of the third lens L3 and the fourth lens L4 dA: Distance on the optical axis from the image side surface of the second lens L2 to the object side surface of the third lens L3 dB: Distance on the optical axis from the image side surface of the third lens L3 to the object side surface of the fourth lens L4

In order to more satisfactorily correct aberrations, the imaging lens satisfies the following conditional expressions (14A) and (15A). The imaging lenses according to Numerical Data Example 1 and Numerical Data Examples 3 to 6 satisfy the conditional expression (14A). The imaging lens according to Numerical Data Example 1 to 6 satisfies the conditional expression (15A).

$$4.0 < f34/f < 10.0 \tag{14A}$$

$$0.3 < dA/dB < 1.5 \tag{15A}$$

The fifth lens L5 is formed in a shape so that a curvature radius R9 of an object side surface and a curvature radius R10 of an image side surface are both positive so as to have a shape of a meniscus lens directing a convex surface thereof to the object side near the optical axis X. In addition, the image side surface of the fifth lens L5 is formed as an aspheric shape so as to have a convex shape on the object side near the optical axis X and has a concave shape on the object side in the periphery. With such shape of the fifth lens L5, it is possible to suitably restrain an incident angle of a light beam emitted from the imaging lens to the image plane.

Here, it is not necessary to satisfy all of the conditional expressions (1) to (15). When any single one of the conditional expressions (1) to (15) is individually satisfied, it is possible to obtain an effect corresponding to the respective conditional expression.

In the embodiment, each lens has a lens surface that is formed as an aspheric surface. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk). Furthermore, L represents a distance on the optical axis from the object side surface of the first lens L1 to the image plane IM.

Numerical Data Example 1

Basic lens data are shown below.

| \multicolumn{5}{c}{f = 3.981 mm, Fno = 2.31, ω = 32.16°} |
| \multicolumn{5}{c}{Unit: mm} |
| \multicolumn{5}{c}{Surface Data} |
| Surface Number i | R | d | Nd | vd |
|---|---|---|---|---|
| (Object) | ∞ | ∞ | | |
| 1* (Stop) | 1.637 | 0.600 | 1.5346 | 56.0 (=vd1) |
| 2* | −32.616 | 0.050 | | |
| 3* | 6.151(=R2f) | 0.320 | 1.6142 | 26.0 (=vd2) |
| 4* | 1.956(=R2r) | 0.393(=dA) | | |
| 5* | 11.050 | 0.436 | 1.5346 | 56.0 (=vd3) |
| 6* | 577.451 | 0.368(=dB) | | |
| 7* | −15.454 | 0.400 | 1.6142 | 26.0 (=vd4) |
| 8* | −18.961 | 0.157 | | |
| 9* | 1.508 | 0.696 | 1.5346 | 56.0 (=vd5) |
| 10* | 1.256 | 0.235 | | |
| 11 | ∞ | 0.300 | 1.5163 | 64.12 |
| 12 | ∞ | 0.767 | | |
| (Image Plane) | ∞ | | | |

$f1 = 2.934$ mm
$f2 = -4.809$ mm
$f3 = 21.068$ mm
$f4 = -142.204$ mm
$f5 = -338.358$ mm
$f34 = 24.831$ mm
$Z_{0.7} = 0.054$ mm
$L = 4.62$ mm

Aspheric Surface Data

First Surface $k = 0.000$, $A_4 = -2.872E-03$, $A_6 = -1.595E-03$, $A_8 = 2.064E-02$,
$A_{10} = -2.880E-02$ Second Surface $k = 0.000$, $A_4 = -7.666E-02$, $A_6 = 2.609E-01$, $A_8 = -3.765E-01$,
$A_{10} = 1.617E-01$ Third Surface $k = 0.000$, $A_4 = -1.611E-01$, $A_6 = 4.112E-01$, $A_8 = -6.070E-01$,
$A_{10} = 3.079E-01$ Fourth Surface $k = 0.000$, $A_4 = -9.785E-02$, $A_6 = 2.488E-01$, $A_8 = -3.216E-01$,
$A_{10} = 1.681E-01$ Fifth Surface $k = 0.000$, $A_4 = -1.150E-01$, $A_6 = 1.621E-01$, $A_8 = -9.680E-02$,
$A_{10} = 2.778E-02$ Sixth Surface $k = 0.000$, $A_4 = -1.711E-01$, $A_6 = 2.129E-01$, $A_8 = -2.767E-01$,
$A_{10} = 2.476E-01$ $A_{12} = -1.092E-01$, $A_{14} = 1.524E-02$,
$A_{16} = 3.922E-03$ Seventh Surface $k = 0.000$, $A_4 = 1.025 -01$, $A_6 = -1.608E-01$, $A_8 = 8.611E-02$,
$A_{10} = -2.751E-02$ $A_{12} = -4.373E-03$, $A_{14} = 1.437E-03$,
$A_{16} = 2.803E-05$ Eighth Surface $k = 0.000$, $A_4 = -3.790E-02$, $A_6 = 6.322E-02$, $A_8 = -4.773E-02$,
$A_{10} = 1.355E-02$, $A_{12} = -3.741E-03$, $A_{14} = 1.293E-03$,
$A_{16} = -1.694E-04$ Ninth Surface $k = -3.022$ $A_4 = -3.313E-01$, $A_6 = 1.694E-01$, $A_8 = -4.558E-02$,
$A_{10} = 1.782E-03$ $A_{12} = 9.158E-04$, $A_{14} = 1.850E-04$,
$A_{16} = -5.656E-05$ -continued f = 3.981 mm, Fno = 2.31, ω = 32.16°
Unit: mm Tenth Surface k = −3.401, $A_4 = -1.661E-01$, $A_6 = 7.946E-02$, $A_8 = -3.006E-02$,
$A_{10} = 7.850E-03$, $A_{12} = -1.649E-03$, $A_{14} = 2.468E-04$,
$A_{16} = -1.788E-05$ The values of the respective conditional expressions are as follows:
f2/f=−1.208
f1/f2=−0.610
R2f/R2r=3.145
f3/f=5.292
$Z_{0.7}$/f=0.013
f34/f=6.237
dA/dB=1.068

Accordingly, the imaging lens of this Numerical Data Example 1 satisfies the respective conditional expressions (1) to (15).

Figure 2:
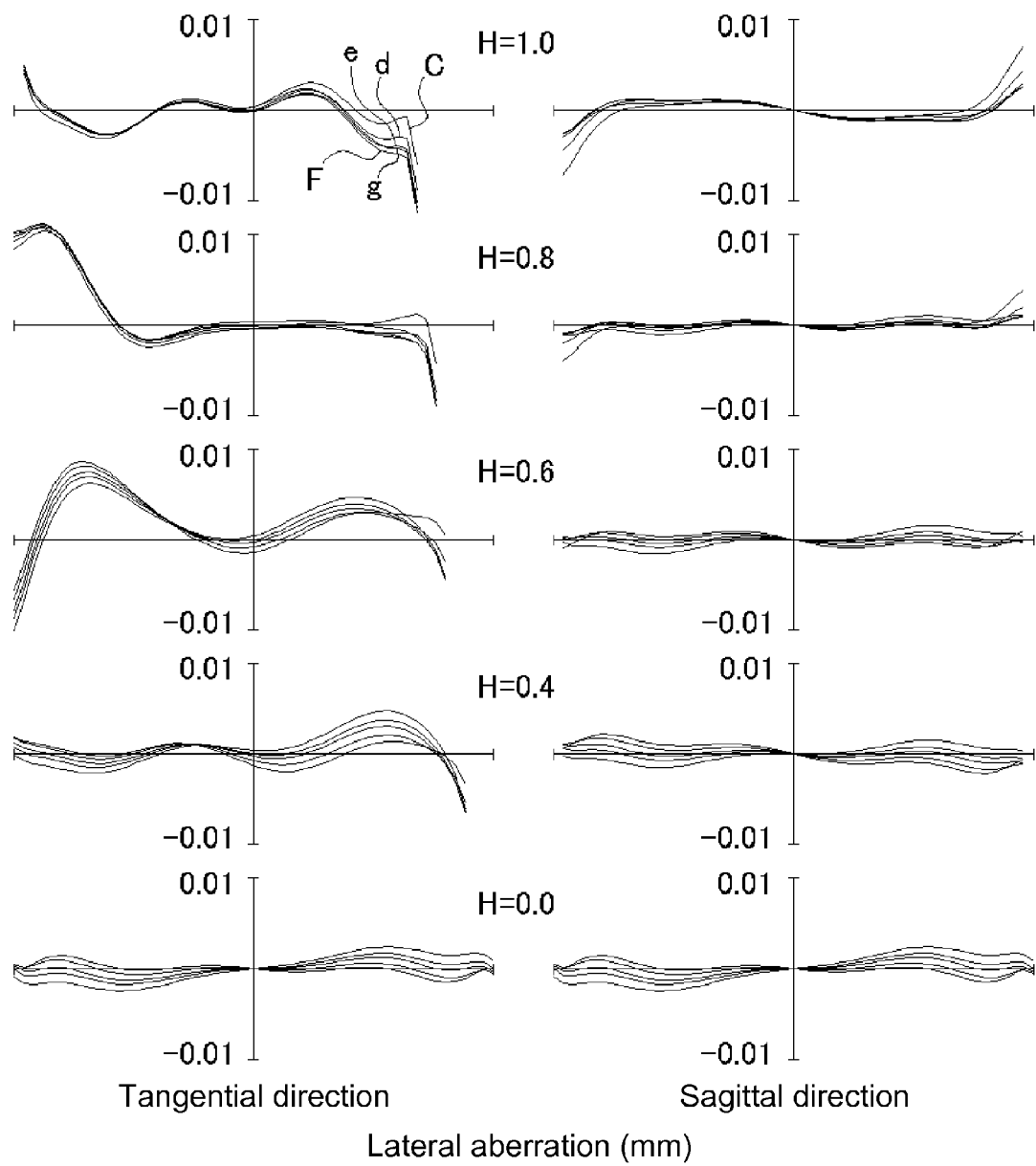
FIG. 2 is an aberration diagram showing a lateral aberration of the imaging lens of FIG. 1.
Figure 3:
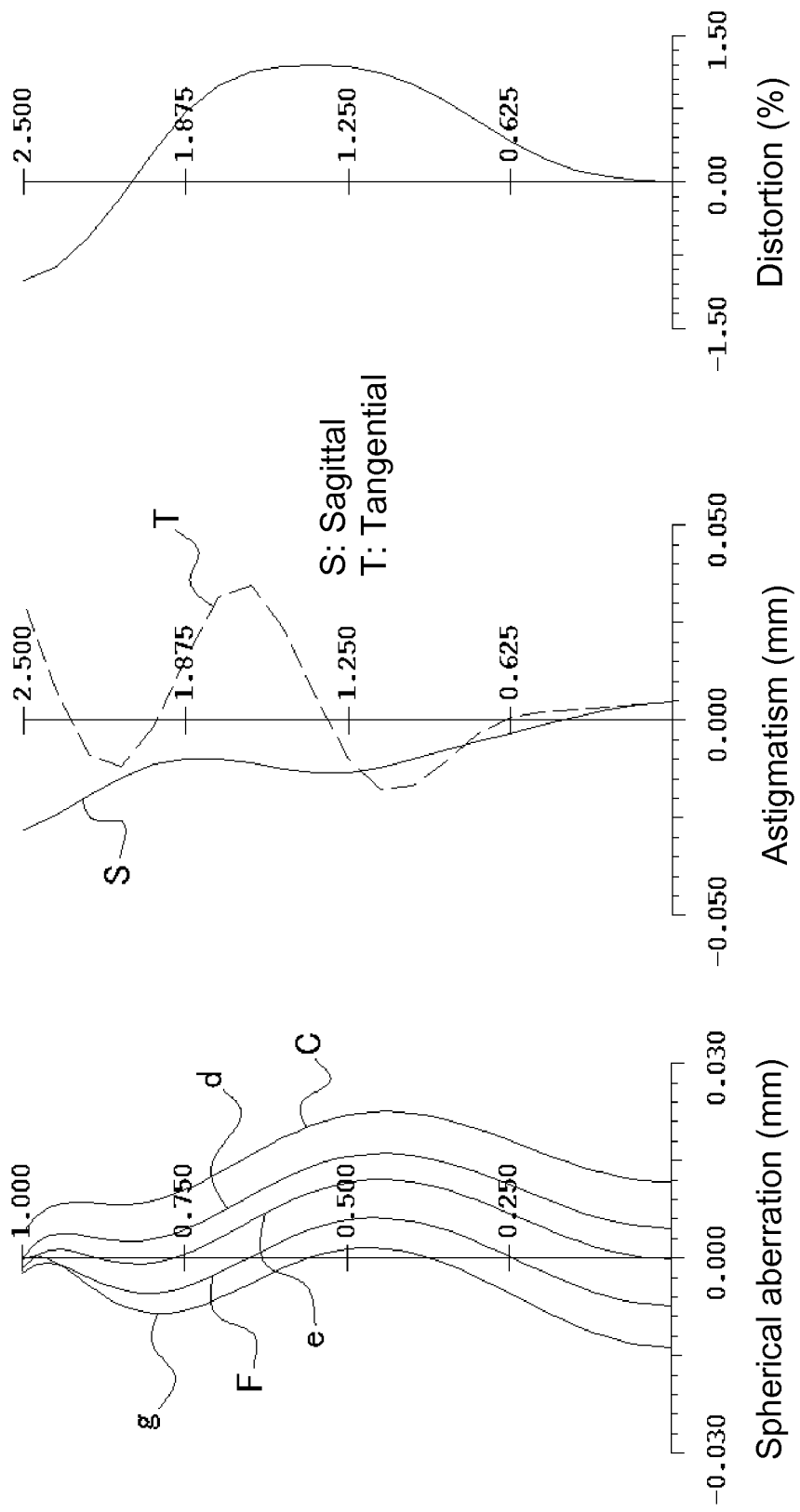
FIG. 3 is an aberration diagram showing a spherical aberration, an astigmatism, and a distortion of the imaging lens of FIG. 1.
Figure 4:
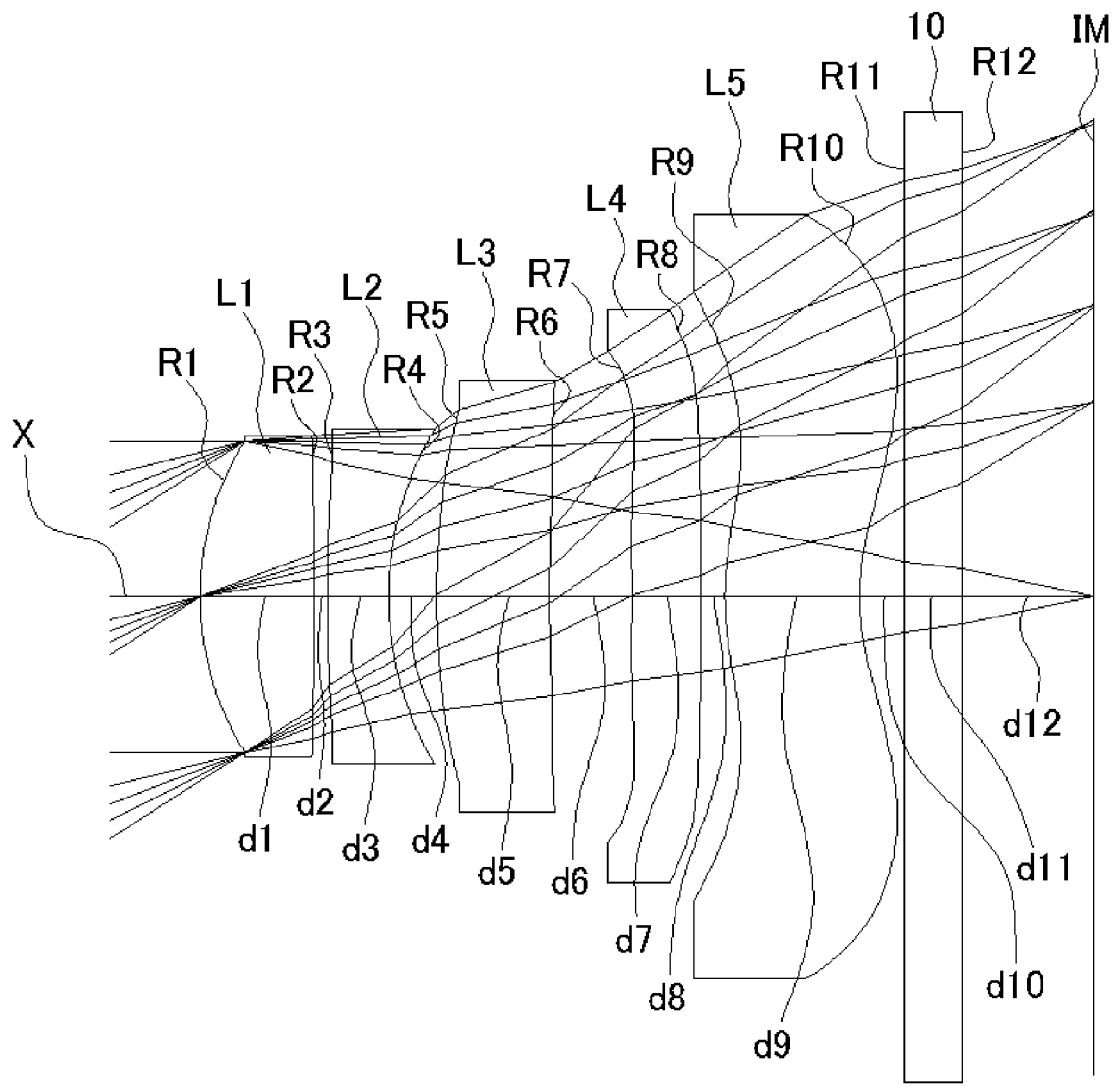
FIG. 4 is a schematic sectional view showing a configuration of an imaging lens in Numerical Data Example 2 according to an embodiment of the invention.

FIG. 2 shows the lateral aberration that corresponds to a ratio H of an image height to the maximum image height (hereinafter referred to as "image height ratio H") in the imaging lens of Numerical Data Example 1 by dividing into a tangential direction and a sagittal direction (which is also the same in FIGS. 5, 8, 11, 14, and 17). Furthermore, FIG. 3 shows a spherical aberration (mm), an astigmatism (mm), and a distortion (%) of the imaging lens of Numerical Data Example 1, respectively. In the aberration diagrams, lateral aberration diagrams and spherical aberration diagrams show aberrations for a g line (435.84 nm), an F line (486.13 nm), an e line (546.07 nm), a d line (587.56 nm), and a C line (656.27 nm), and astigmatism diagram shows the aberration on the sagittal image surface S and the aberration on the tangential image surface T, respectively (which are the same in FIGS. 6, 9, 12, 15, and 18). As shown in FIGS. 2 and 3, according to this Numerical Data Example 1, it is possible, to satisfactorily correct aberrations.

Numerical Data Example 2

Basic lens data are shown below.

f = 3.976 mm, Fno = 2.42, ω = 32.16°
Unit: mm

Surface Data

| Surface Number i | R | d | Nd | vd |
|---|---|---|---|---|
| (Object) | ∞ | ∞ | | |
| 1* (Stop) | 1.558 | 0.600 | 1.5346 | 56.0 (=vd1) |
| 2* | −12.051 | 0.068 | | |
| 3* | 9.638(=R2f) | 0.320 | 1.6142 | 26.0 (=vd2) |
| 4* | 1.629(=R2r) | 0.250(=dA) | | |
| 5* | 3.657 | 0.597 | 1.5346 | 56.0 (=vd3) |
| 6* | 7.759 | 0.430(=dB) | | |
| 7* | −17.253 | 0.363 | 1.6142 | 26.0 (=vd4) |
| 8* | −18.743 | 0.123 | | |
| 9* | 1.475 | 0.707 | 1.5346 | 56.0 (=vd5) |
| 10* | 1.218 | 0.235 | | |
| 11 | ∞ | 0.300 | 1.5163 | 64.12 |
| 12 | ∞ | 0.689 | | |
| (Image Plane) | ∞ | | | | f1 = 2.621 mm
f2 = −3.242 mm
f3 = 12.317 mm
f4 = −389.265 mm
f5 = −348.964 mm
f34 = 12.778 mm
$Z_{0.7}$ = 0.055 mm
L = 4.58 mm

Aspheric Surface Data

First Surface k = 0.000, $A_4 = 7.436E-04$, $A_6 = -1.697E-03$, $A_8 = 3.632E-02$,
$A_{10} = -4.223E-02$ Second Surface k = 0.000, $A_4 = 5.202E-02$, $A_6 = 1.418E-01$, $A_8 = -3.879E-01$,
$A_{10} = 2.062E-01$ -continued f = 3.976 mm, Fno = 2.42, ω = 32.16°
Unit: mm Third Surface k = 0.000, $A_4$ = −3.663E−02, $A_6$ = 2.840E−01, $A_8$ = −6.571E−01,
$A_{10}$ = 3.960E−01

Fourth Surface k = 0.000, $A_4$ = −1.159E−01, $A_6$ = 3.142E−01, $A_8$ = −4.591E−01,
$A_{10}$ = 2.641E−01

Fifth Surface k = 0.000, $A_4$ = −1.049E−01, $A_6$ = 1.795E−01, $A_8$ = −1.117E−01,
$A_{10}$ = 2.213E−02

Sixth Surface k = 0.000, $A_4$ = −1.107E−01, $A_6$ = 1.462E−01, $A_8$ = −2.267E−01,
$A_{10}$ = 2.435E−01, $A_{12}$ = −1.238E−01, $A_{14}$ = 2.546E−02,
$A_{16}$ = −1.262E−03

Seventh Surface k = 0.000, $A_4$ = 1.915E−01, $A_6$ = −2.620E−01, $A_8$ = 1.558E−01,
$A_{10}$ = −5.362E−02, $A_{12}$ = −1.039E−02, $A_{14}$ = 1.172E−02,
$A_{16}$ = −1.809E−03

Eighth Surface k = 0.000, $A_4$ = 6.708E−03, $A_6$ = 3.015E−02, $A_8$ = −4.305E−02,
$A_{10}$ = 1.452E−02, $A_{12}$ = −3.583E−03, $A_{14}$ = 1.332E−03,
$A_{16}$ = −2.117E−04

Ninth Surface k = −4.937, $A_4$ = −3.147E−01, $A_6$ = 1.677E−01, $A_8$ = −4.332E−02,
$A_{10}$ = 1.805E−03, $A_{12}$ = 8.019E−04, $A_{14}$ = 1.304E−04,
$A_{16}$ = −4.485E−05

Tenth Surface k = −4.122, $A_4$ = −1.684E−01, $A_6$ = 8.590E−02, $A_8$ = −3.445E−02,
$A_{10}$ = 9.084E−03, $A_{12}$ = −1.696E−03, $A_{14}$ = 2.153E−04,
$A_{16}$ = −1.435E−05

The values of the respective conditional expressions are as follows:
f2/f=−0.815
f1/f2=−0.808
R2f/R2r=5.917
f3/f=3.098
$Z_{0.7}$/f=0.014
f34/f=3.214
dA/dB=0.581

Accordingly, the imaging lens of this Numerical Data Example 2 satisfies the respective conditional expressions (1) to (15).

Figure 5:
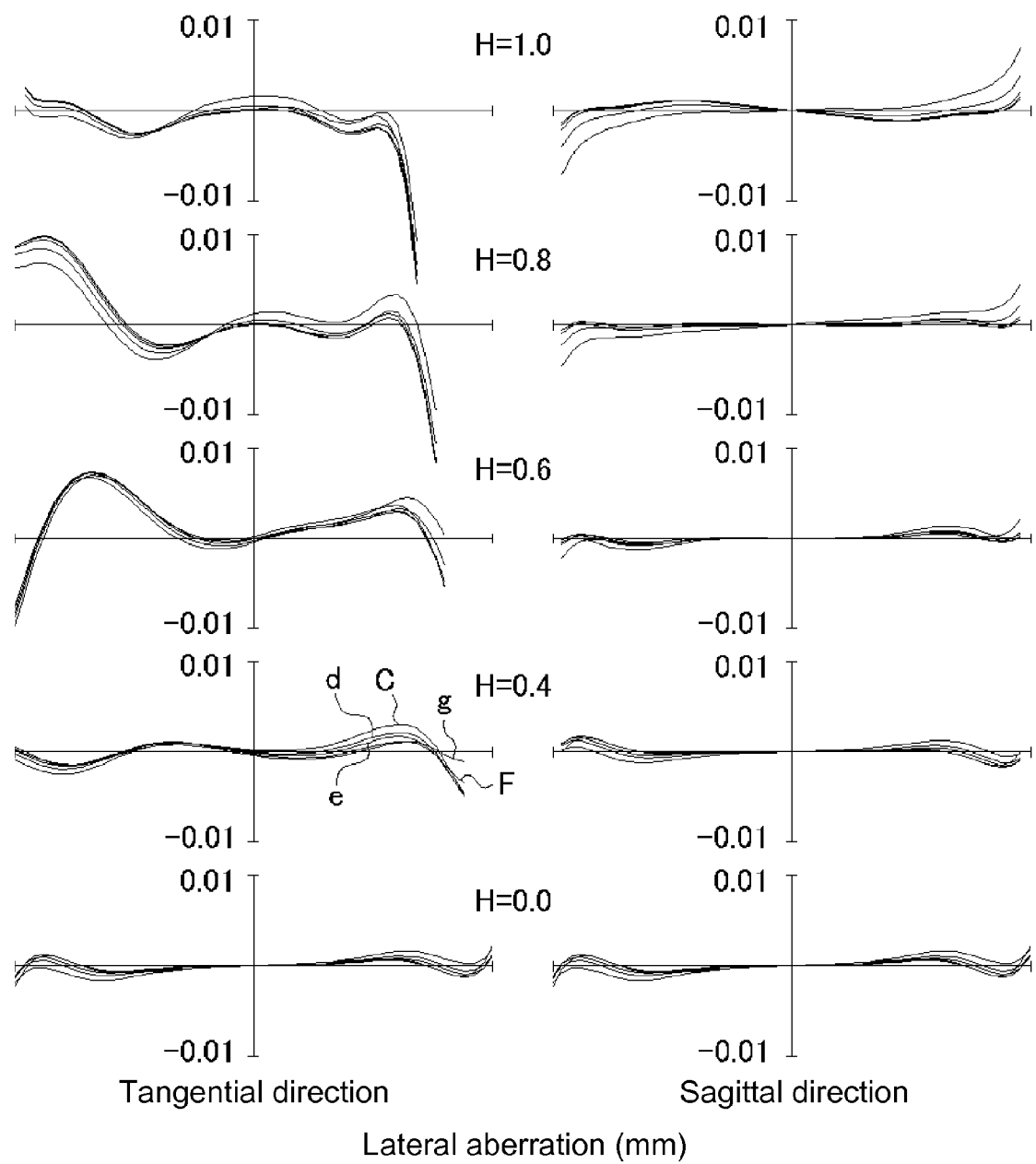
FIG. 5 is an aberration diagram showing a lateral aberration of the imaging lens of FIG. 4.
Figure 6:
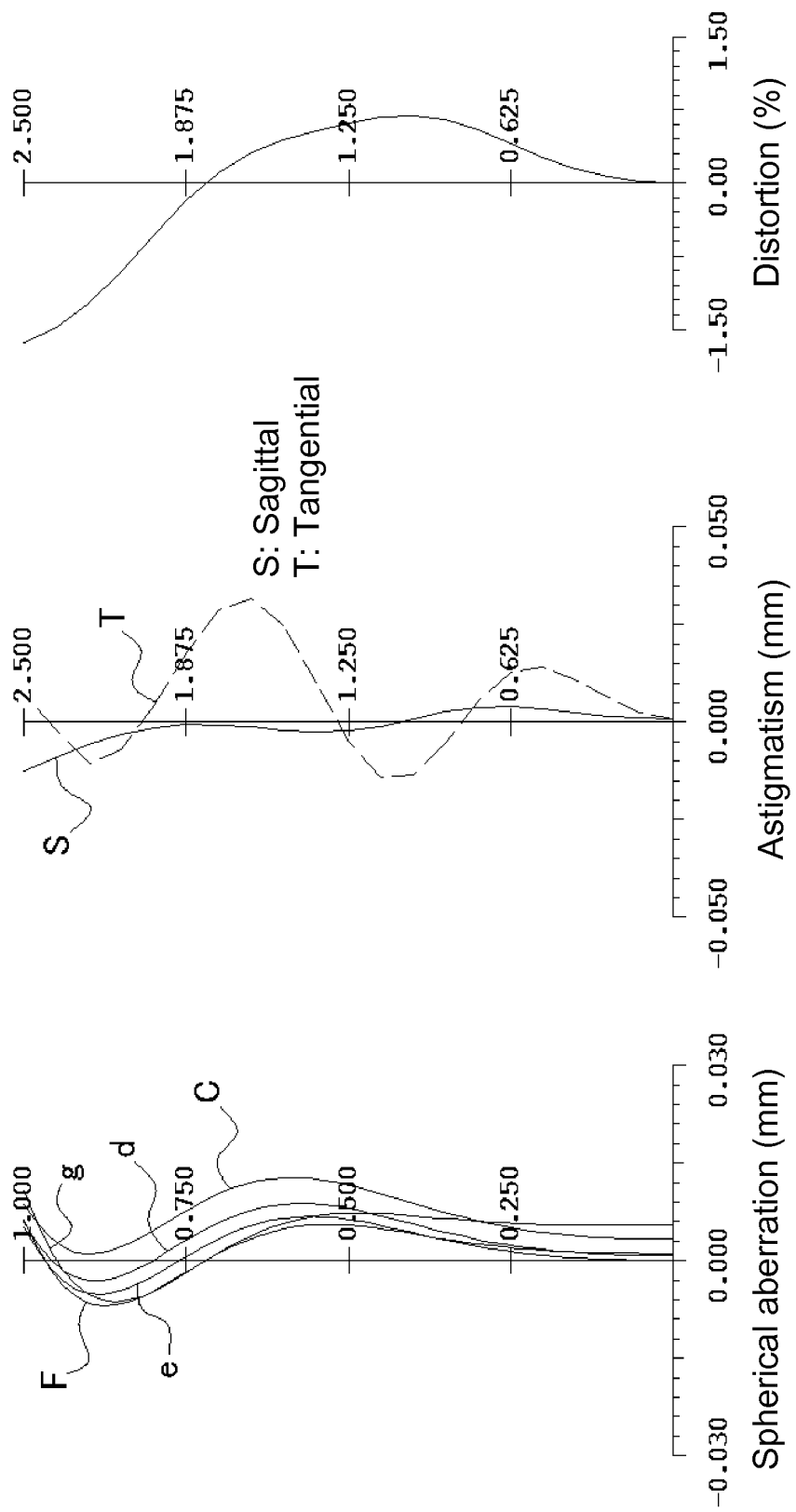
FIG. 6 is an aberration diagram showing a spherical aberration, an astigmatism, and a distortion of the imaging lens of FIG. 4.
Figure 7:
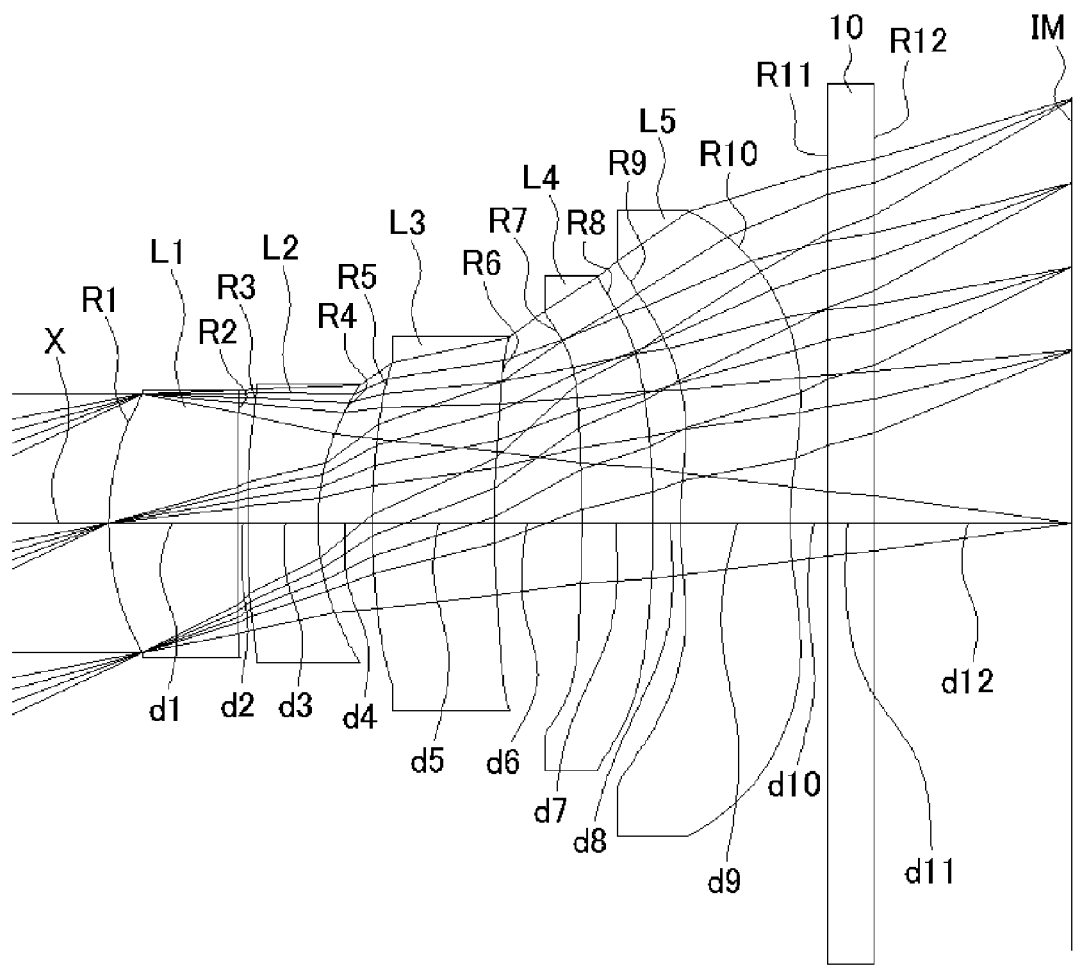
FIG. 7 is a schematic sectional view showing a configuration of an imaging lens in Numerical Data Example 3 according to an embodiment of the invention.

FIG. 5 shows the lateral aberration that corresponds to the image height ratio H in the imaging lens of Numerical Data Example 2. Furthermore, FIG. 6 shows a spherical aberration (mm), an astigmatism (mm), and a distortion (%), respectively. As shown in FIGS. 5 and 6, also with the imaging lens of this Numerical Data Example 2, the image surface is satisfactorily corrected and aberrations are suitably corrected, similarly to Numerical Data Example 1.

Numerical Data Example 3

Basic lens data are shown below.

f = 5.905 mm, Fno = 3.61, ω = 25.37°
Unit: mm

Surface Data

| Surface Number i | R | d | Nd | vd |
|---|---|---|---|---|
| (Object) | ∞ | ∞ | | |
| 1* (Stop) | 1.715 | 0.820 | 1.5346 | 56.0(=vd1) |
| 2* | −9.433 | 0.058 | | |
| 3* | 8.995(=R2f) | 0.448 | 1.6142 | 26.0(=vd2) |
| 4* | 1.512(=R2r) | 0.345(=dA) | | |
| 5* | 4.101 | 0.770 | 1.5346 | 56.0(=vd3) |
| 6* | 5.060 | 0.557(=dB) | | |
| 7* | −5.909 | 0.453 | 1.6142 | 26.0(=vd4) |
| 8* | −6.261 | 0.71 | | |

-continued f = 5.905 mm, Fno = 3.61, ω = 25.37°
Unit: mm

| | | | | |
|---|---|---|---|---|
| 9* | 2.133 | 0.696 | 1.5346 | 56.0 (=νd5) |
| 10* | 1.822 | 0.235 | | |
| 11 | ∞ | 0.300 | 1.5163 | 64.12 |
| 12 | ∞ | 1.248 | | |
| (Image Plane) | ∞ | | | | f1 = 2.786 mm
f2 = −3.028 mm
f3 = 31.642 mm
f4 = −336.142 mm
f5 = −105.912 mm
f34 = 35.707 mm
$Z_{0.7}$ = 0.121 mm
L = 6.00 mm

Aspheric Surface Data

First Surface k = 0.000, $A_4$ = 2.748E−03, $A_6$ = −6.028E−03, $A_8$ = 3.410E−02,
$A_{10}$ = −2.208E−02

Second Surface k = 0.000, $A_4$ = 9.597E−02, $A_6$ = 1.868E−01, $A_8$ = −4.090E−01,
$A_{10}$ = 2.008E−01

Third Surface k = 0.000, $A_4$ = 1.786E−02, $A_6$ = 3.030E−01, $A_8$ = −5.887E−01,
$A_{10}$ = 2.732E−01

Fourth Surface k = 0.000, $A_4$ = −1.254E−01, $A_6$ = 3.624E−01, $A_8$ = −4.699E−01,
$A_{10}$ = 2.040E−01

Fifth Surface k = 0.000, $A_4$ = −1.074E−01, $A_6$ = 1.674E−01, $A_8$ = −8.020E−02,
$A_{10}$ = 1.429E−02

Sixth Surface k = 0.000, $A_4$ = −9.229E−02, $A_6$ = 1.300E−01, $A_8$ = −2.237E−01,
$A_{10}$ = 2.431E−01, $A_{12}$ = −1.248E−01, $A_{14}$ = 2.626E−02,
$A_{16}$ = −2.083E−04

Seventh Surface k = 0.000, $A_4$ = 1.722E−01, $A_6$ = −2.438E−01, $A_8$ = 1.486E−01,
$A_{10}$ = −5.376E−02, $A_{12}$ = −8.934E−03, $A_{14}$ = 1.232E−02,
$A_{16}$ = −1.890E−03

Eighth Surface k = 0.000, $A_4$ = −1.534E−02, $A_6$ = 3.450E−02, $A_8$ = −4.167E−02,
$A_{10}$ = 1.454E−02, $A_{12}$ = −3.636E−03, $A_{14}$ = 1.329E−03,
$A_{16}$ = −2.025E−04

Ninth Surface k = −1.541E+01, $A_4$ = −3.113E−01, $A_6$ = 1.666E−01, $A_8$ = −4.358E−02,
$A_{10}$ = 1.880E−03, $A_{12}$ = 8.446E−04, $A_{14}$ = 1.385E−04,
$A_{16}$ = −4.609E−05

Tenth Surface k = −1.353E+01, $A_4$ = −1.766E−01, $A_6$ = 8.321E−02, $A_8$ = −3.230E−02,
$A_{10}$ = 9.143E−03, $A_{12}$ = −1.783E−03, $A_{14}$ = 2.034E−04,
$A_{16}$ = −1.120E−05

The values of the respective conditional expressions are as follows:

f2/f=−0.513
f1/f2=−0.920
R2f/R2r=5.949
f3/f=5.359
$Z_{0.7}$/f=0.021
f34/f=6.041
dA/dB=0.1619

Accordingly, the imaging lens of this Numerical Data Example 3 satisfies the respective conditional expressions (1) to (15).

Figure 8:
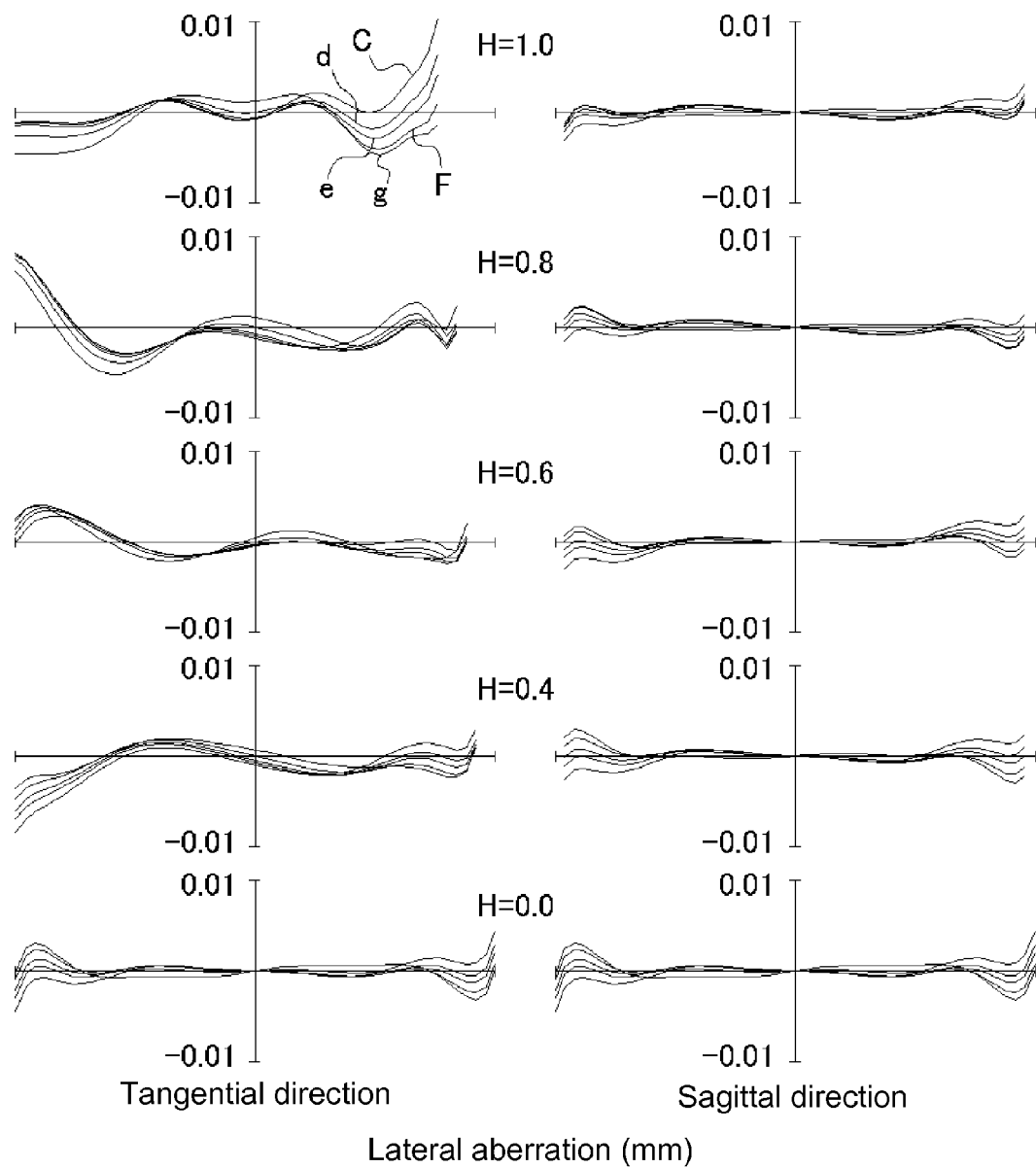
FIG. 8 is an aberration diagram showing a lateral aberration of the imaging lens of FIG. 7.
Figure 9:
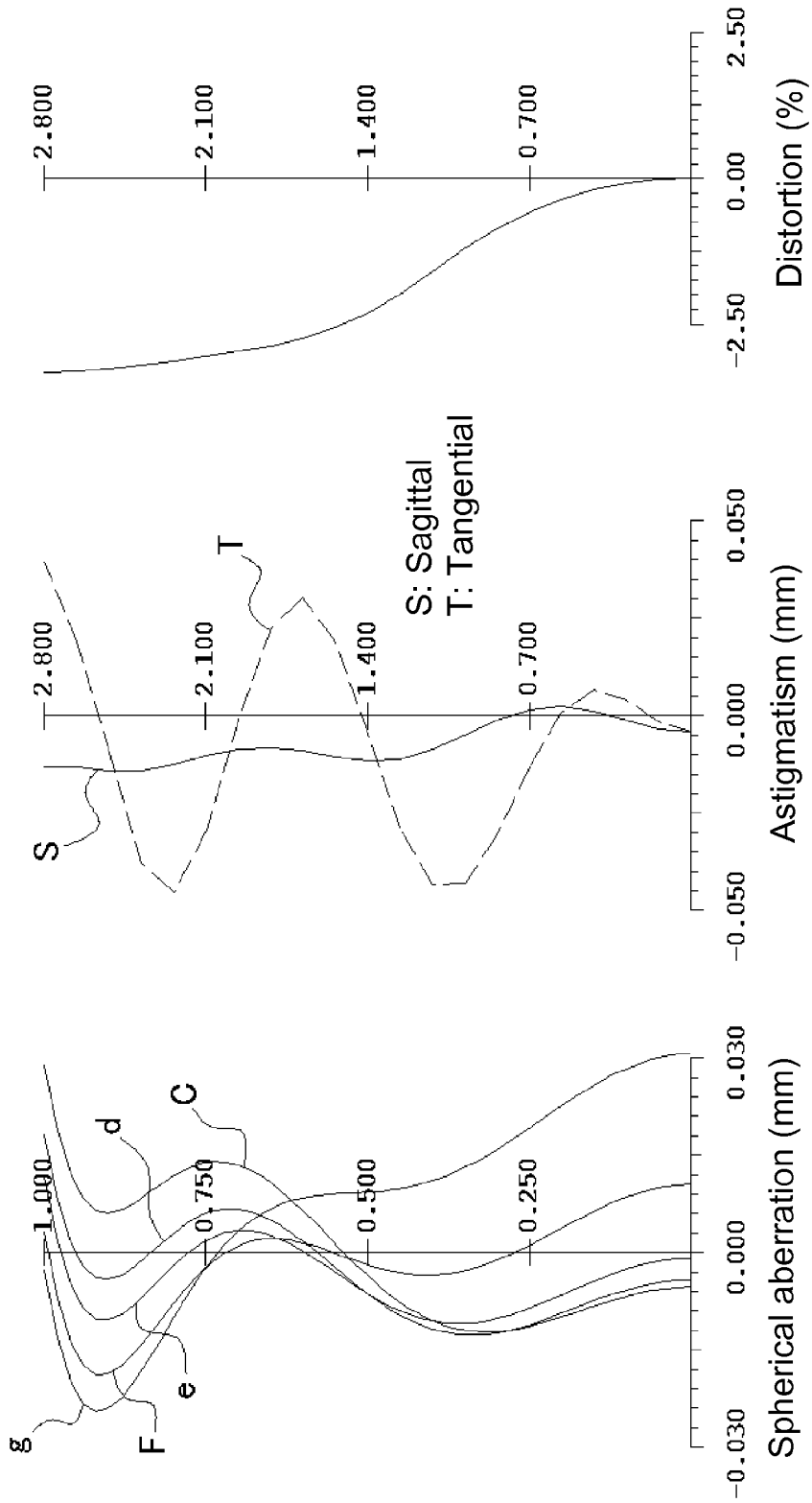
FIG. 9 is an aberration diagram showing a spherical aberration, an astigmatism, and a distortion of the imaging lens of FIG. 7.
Figure 10:
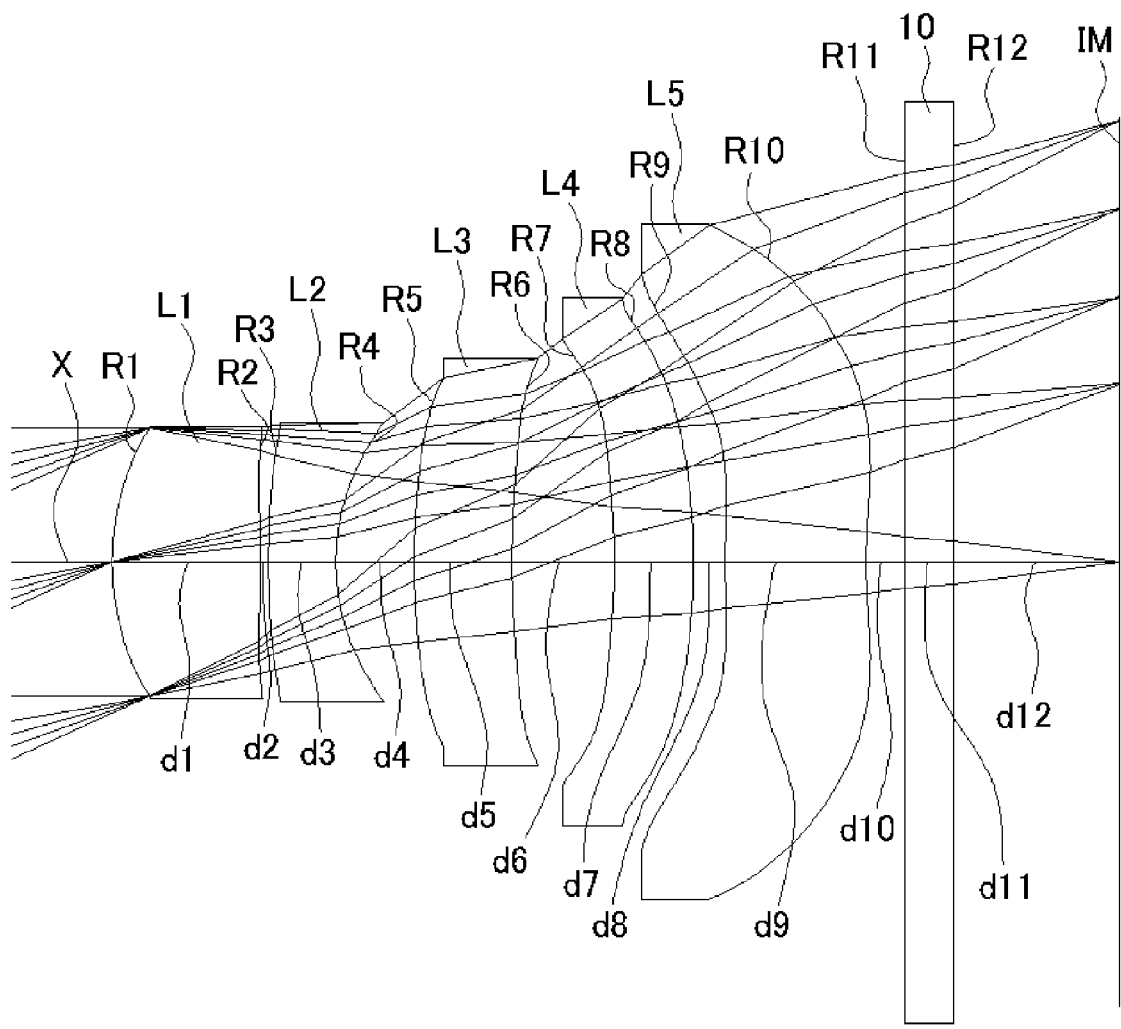
FIG. 10 is a schematic sectional view showing a configuration of an imaging lens in Numerical Data Example 4 according to an embodiment of the invention.

FIG. 8 shows the lateral aberration that corresponds to the image height ratio H in the imaging lens of Numerical Data Example 3. Furthermore, FIG. 9 shows a spherical aberration (mm), an astigmatism (mm), and a distortion (%), respectively. As shown in FIGS. 8 and 9, also with the imaging lens of this Numerical Data Example 3, the image surface is satisfactorily corrected and aberrations are suitably corrected, similarly to Numerical Data Example 1.

Numerical Data Example 4

Basic lens data are shown below.

| \multicolumn{5}{c}{f = 6.207 mm, Fno = 3.79, ω = 24.28°} |
| \multicolumn{5}{c}{Unit: mm} |
| \multicolumn{5}{c}{Surface Data} |
| Surface Number i | R | d | Nd | νd |
| --- | --- | --- | --- | --- |
| (Object) | ∞ | ∞ | | |
| 1* (Stop) | 1.594 | 0.899 | 1.5346 | 56.0 (=νd1) |
| 2* | −6.338 | 0.049 | | |
| 3* | 7.593(=R2f) | 0.407 | 1.6142 | 26.0 (=νd2) |
| 4* | 1.281(=R2r) | 0.475(=dA) | | |
| 5* | 4.458 | 0.592 | 1.5346 | 56.0 (=νd3) |
| 6* | 5.494 | 0.618(=dB) | | |
| 7* | −3.959 | 0.482 | 1.6142 | 26.0 (=νd4) |
| 8* | −4.223 | 0.192 | | |
| 9* | 3.908 | 0.852 | 1.5346 | 56.0 (=νd5) |
| 10* | 2.645 | 0.235 | | |
| 11 | ∞ | 0.300 | 1.5163 | 64.12 |
| 12 | ∞ | 1.001 | | |
| (Image Plane) | ∞ | | | | f1 = 2.481 mm
f2 = −2.573 mm
f3 = 36.884 mm
f4 = −335.148 mm
f5 = −20.010 mm
f34 = 43.214 mm
$Z_{0.7}$ = 0.176 mm
L = 6.00 mm

Aspheric Surface Data

First Surface k = 0.000, $A_4$ = 1.075E−04, $A_6$ = 6.187E−03, $A_8$ = 1.284E−02,
$A_{10}$ = −4.704E−03

Second Surface k = 0.000, $A_4$ = 1.530E−01, $A_6$ = 1.715E−01, $A_8$ = −4.549E−01,
$A_{10}$ = 2.515E−01

Third Surface k = 0.000, $A_4$ = 4.820E−02, $A_6$ = 2.777E−01, $A_8$ = −5.954E−01,
$A_{10}$ = 2.648E−01

Fourth Surface k = 0.000, $A_4$ = −1.467E−01, $A_6$ = 4.135E−01, $A_8$ = −5.821E−01,
$A_{10}$ = 2.475E−01

Fifth Surface k = 0.000, $A_4$ = −8.933E−02, $A_6$ = 1.622E−01, $A_8$ = −6.379E−02,
$A_{10}$ = 2.913E−03

Sixth Surface k = 0.000, $A_4$ = −7.999E−02, $A_6$ = 1.406E−01, $A_8$ = −2.176E−01,
$A_{10}$ = 2.425E−01, $A_{12}$ = −1.261E−01, $A_{14}$ = 2.610E−02,
$A_{16}$ = −1.113E−03

Seventh Surface k = 0.000, $A_4$ = 1.641E−01, $A_6$ = −2.353E−01, $A_8$ = 1.446E−01,
$A_{10}$ = −5.362E−02, $A_{12}$ = −7.907E−03, $A_{14}$ = 1.249E−02,
$A_{16}$ = −2.055E−03

Eighth Surface k = 0.000, $A_4$ = −2.186E−02, $A_6$ = 3.785E−02, $A_8$ = −4.121E−02,
$A_{10}$ = 1.436E−02, $A_{12}$ = −3.702E−03, $A_{14}$ = 1.329E−03,
$A_{16}$ = −1.831E−04

-continued $f = 6.207$ mm, Fno = 3.79, $\omega = 24.28°$
Unit: mm

Ninth Surface $k = -1.497E+02$, $A_4 = -3.066E-01$, $A_6 = 1.696E-01$, $A_8 = -4.330E-02$,
$A_{10} = 2.012E-03$, $A_{12} = 8.540E-04$, $A_{14} = 1.332E-04$,
$A_{16} = -5.106E-05$ Tenth Surface $k = -5.878E+01$, $A_4 = -1.709E-01$, $A_6 = 7.618E-02$, $A_8 = -2.994E-02$,
$A_{10} = 9.138E-03$, $A_{12} = -1.841E-03$, $A_{14} = 1.982E-04$,
$A_{16} = -9.281E-06$ The values of the respective conditional expressions are as follows:
f2/f=−0.415
f1/f2=−0.964
R2f/R2r=5.927
f3/f=5.942
$Z_{0.7}$/f=0.028
f34/f=6.962
dA/dB=0.769

Accordingly, the imaging lens of this Numerical Data Example 4 satisfies the respective conditional expressions (1) to (15).

Figure 11:
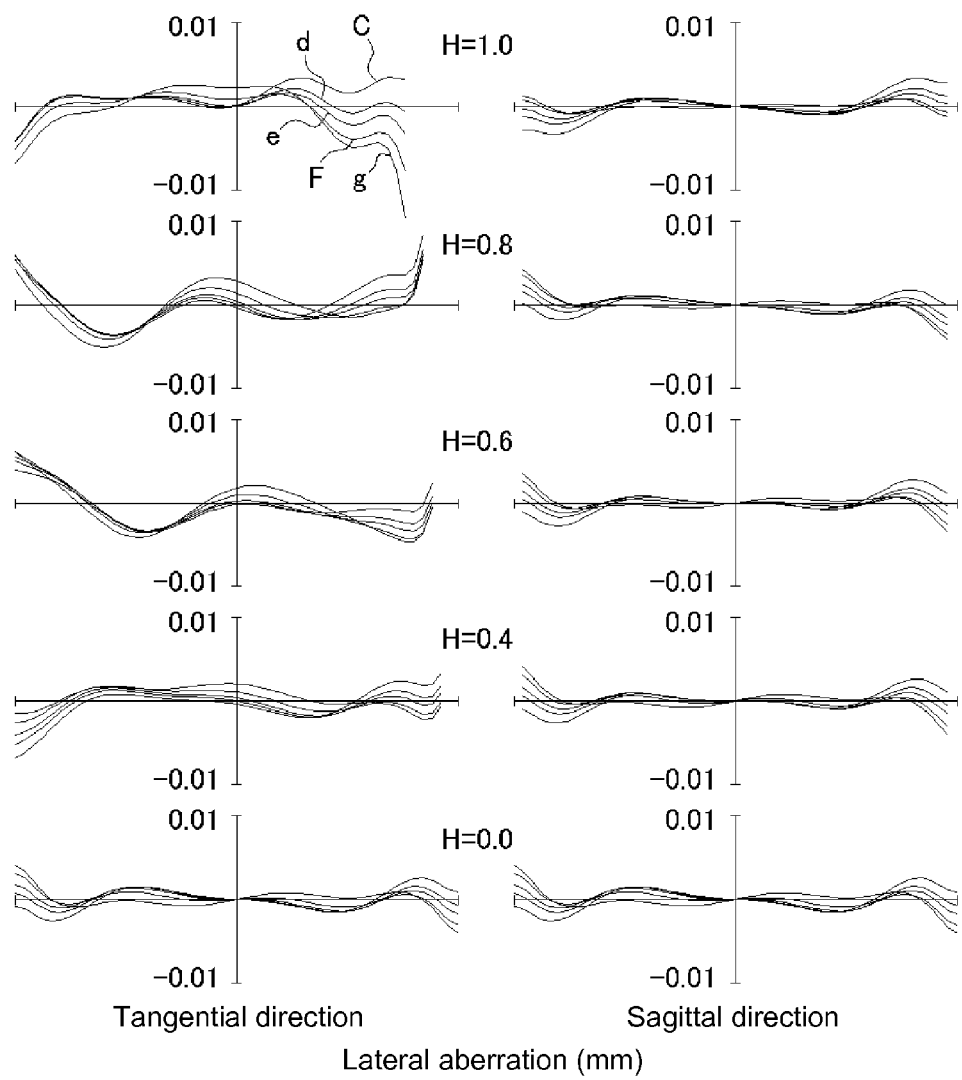
FIG. 11 is an aberration diagram showing a lateral aberration of the imaging lens of FIG. 10.
Figure 12:
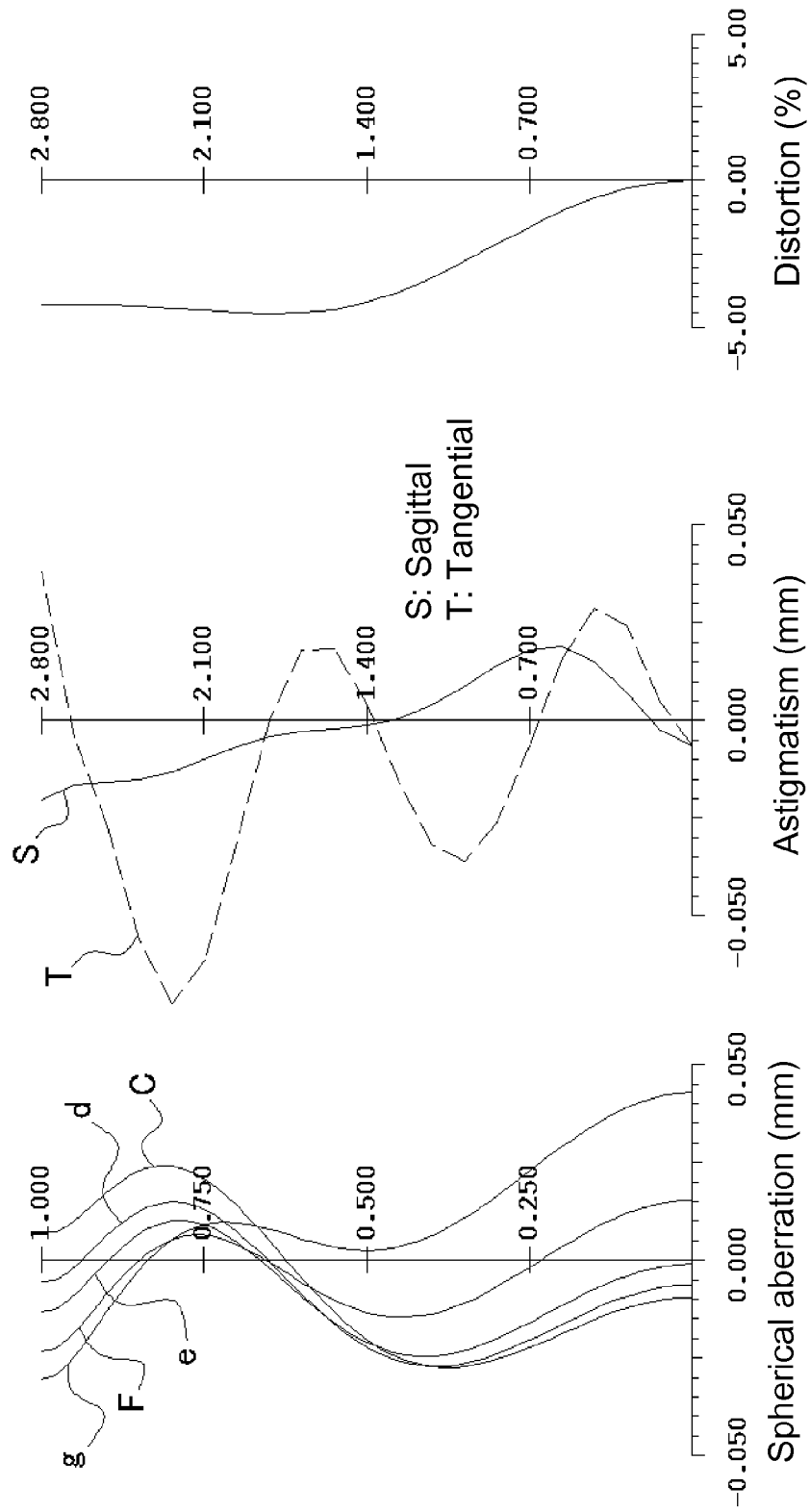
FIG. 12 is an aberration diagram showing a spherical aberration, an astigmatism, and a distortion of the imaging lens of FIG. 10.
Figure 13:
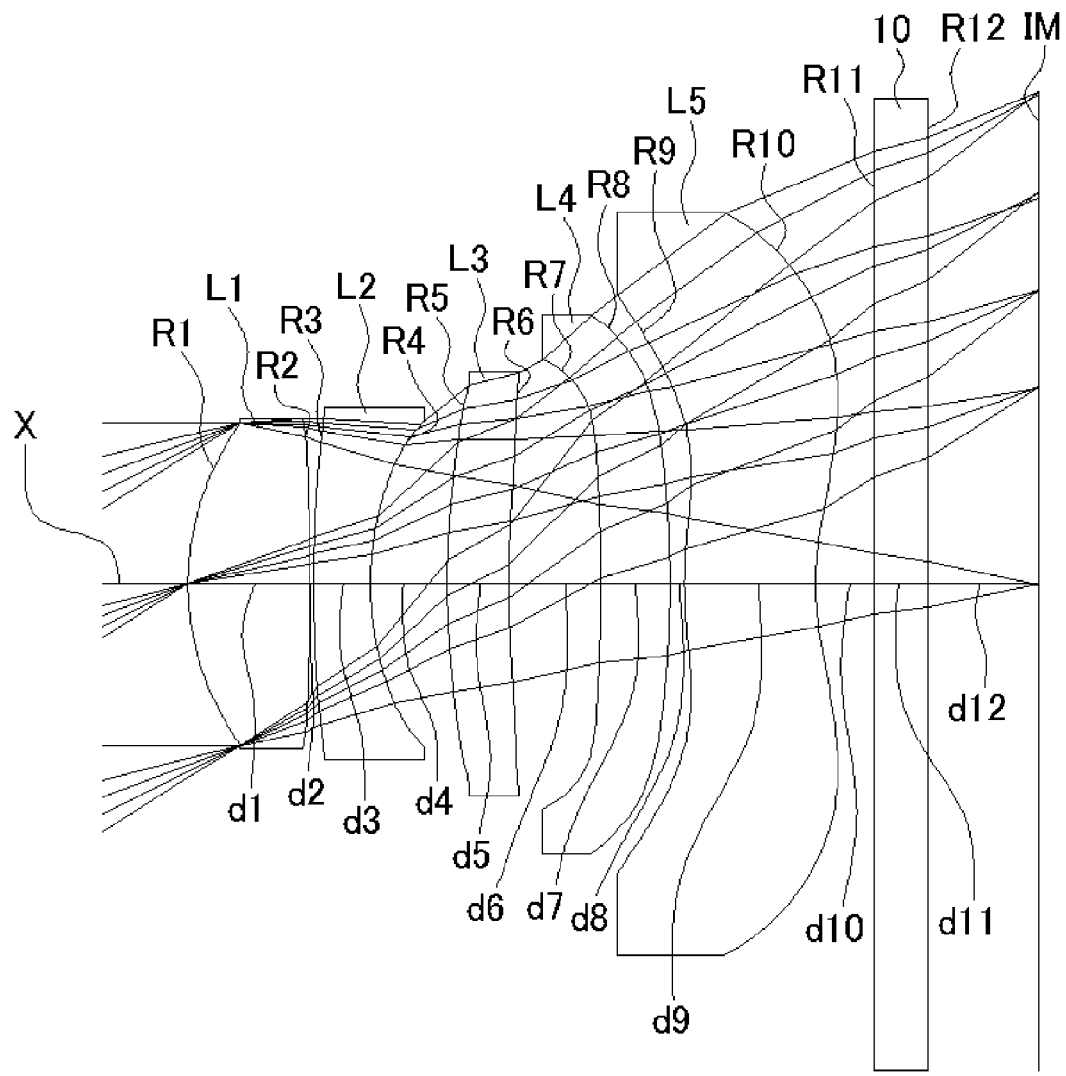
FIG. 13 is a schematic sectional view showing a configuration of an imaging lens in Numerical Data Example 5 according to an embodiment of the invention.

FIG. 11 shows the lateral aberration that corresponds to the image height ratio H in the imaging lens of Numerical Data Example 4. Furthermore, FIG. 12 shows a spherical aberration (mm), an astigmatism (mm), and a distortion (%), respectively. As shown in FIGS. 11 and 12, also with the imaging lens of this Numerical Data Example 4, the image surface is satisfactorily corrected and aberrations are suitably corrected, similarly to Numerical Data Example 1.

Numerical Data Example 5

Basic lens data are shown below.

$f = 4.335$ mm, Fno = 2.40, $\omega = 31.92°$
Unit: mm

Surface Data

| Surface Number i | R | d | Nd | vd |
|---|---|---|---|---|
| (Object) | ∞ | ∞ | | |
| 1* (Stop) | 1.473 | 0.676 | 1.5346 | 56.0 (=vd1) |
| 2* | −13.513 | 0.022 | | |
| 3* | 7.452(=R2f) | 0.315 | 1.6142 | 26.0 (=vd2) |
| 4* | 1.721(=R2r) | 0.424(=dA) | | |
| 5* | 3.881 | 0.342 | 1.5346 | 56.0 (=vd3) |
| 6* | 5.288 | 0.512(=dB) | | |
| 7* | −6.039 | 0.379 | 1.6142 | 26.0 (=vd4) |
| 8* | −6.720 | 0.083 | | |
| 9* | 2.418 | 0.727 | 1.5346 | 56.0 (=vd5) |
| 10* | 1.735 | 0.320 | | |
| 11 | ∞ | 0.300 | 1.5163 | 64.12 |
| 12 | ∞ | 0.616 | | |
| (Image Plane) | ∞ | | | | f1 = 2.524 mm
f2 = −3.722 mm
f3 = 26.171 mm
f4 = −123.252 mm
f5 = −18.250 mm
f34 = 33.700 mm
$Z_{0.7}$ = 0.107 mm
L = 4.61 mm

Aspheric Surface Data

First Surface $k = -2.291E-02$, $A_4 = -7.294E-03$, $A_6 = -1.200E-02$, $A_8 = 2.498E-02$,
$A_{10} = -3.959E-02$ Second Surface $k = 0.000$, $A_4 = -1.044E-02$, $A_6 = 1.227E-01$, $A_8 = -1.891E-01$,
$A_{10} = 4.959E-02$ Third Surface $k = 1.250E+01$, $A_4 = -9.164E-02$, $A_6 = 3.173E-01$, $A_8 = -3.816E-01$,
$A_{10} = 1.484E-01$ -continued $f = 4.335$ mm, Fno = 2.40, $\omega = 31.92°$
Unit: mm Fourth Surface $k = 0.000$, $A_4 = -7.290E-02$, $A_6 = 2.383E-01$, $A_8 = -1.853E-01$,
$A_{10} = 9.753E-02$ Fifth Surface $k = 3.341E-01$, $A_4 = -9.001E-02$, $A_6 = 6.729E-02$, $A_8 = -2.705E-02$,
$A_{10} = 1.231E-02$ Sixth Surface $k = 5.595E-01$, $A_4 = -8.905E-02$, $A_6 = 9.283E-02$, $A_8 = -1.770E-01$,
$A_{10} = 2.265E-01$, $A_{12} = -1.565E-01$, $A_{14} = 5.876E-02$,
$A_{16} = -9.116E-03$ Seventh Surface $k = -3.812$, $A_4 = 1.386E-01$, $A_6 = -1.734E-01$, $A_8 = 6.787E-02$,
$A_{10} = -2.732E-02$, $A_{12} = -1.570E-03$ Eighth Surface $k = 7.754$, $A_4 = -2.881E-03$, $A_6 = 1.415E-02$, $A_8 = -3.074E-02$,
$A_{10} = 9.835E-03$, $A_{12} = -2.390E-03$, $A_{14} = 3.110E-04$,
$A_{16} = 7.347E-05$ Ninth Surface $k = -1.086$, $A_4 = -3.483E-01$, $A_6 = 1.374E-01$, $A_8 = -2.554E-02$,
$A_{10} = 8.144E-04$, $A_{12} = 4.823E-04$, $A_{14} = -4.995E-05$,
$A_{16} = -4.697E-06$ Tenth Surface $k = -4.595$, $A_4 = -1.572E-01$, $A_6 = 6.504E-02$, $A_8 = -2.245E-02$,
$A_{10} = 4.885E-03$, $A_{12} = -6.066E-04$, $A_{14} = 3.591E-05$,
$A_{16} = -1.270E-06$ The values of the respective conditional expressions are as follows:
f2/f=−0.859
f1/f2=−0.678
R2f/R2r=4.330
f3/f=6.037
$Z_{0.7}$/f=0.025
f34/f=7.774
dA/dB=0.828

Accordingly, the imaging lens of this Numerical Data Example 5 satisfies the respective conditional expressions (1) to (15).

Figure 14:
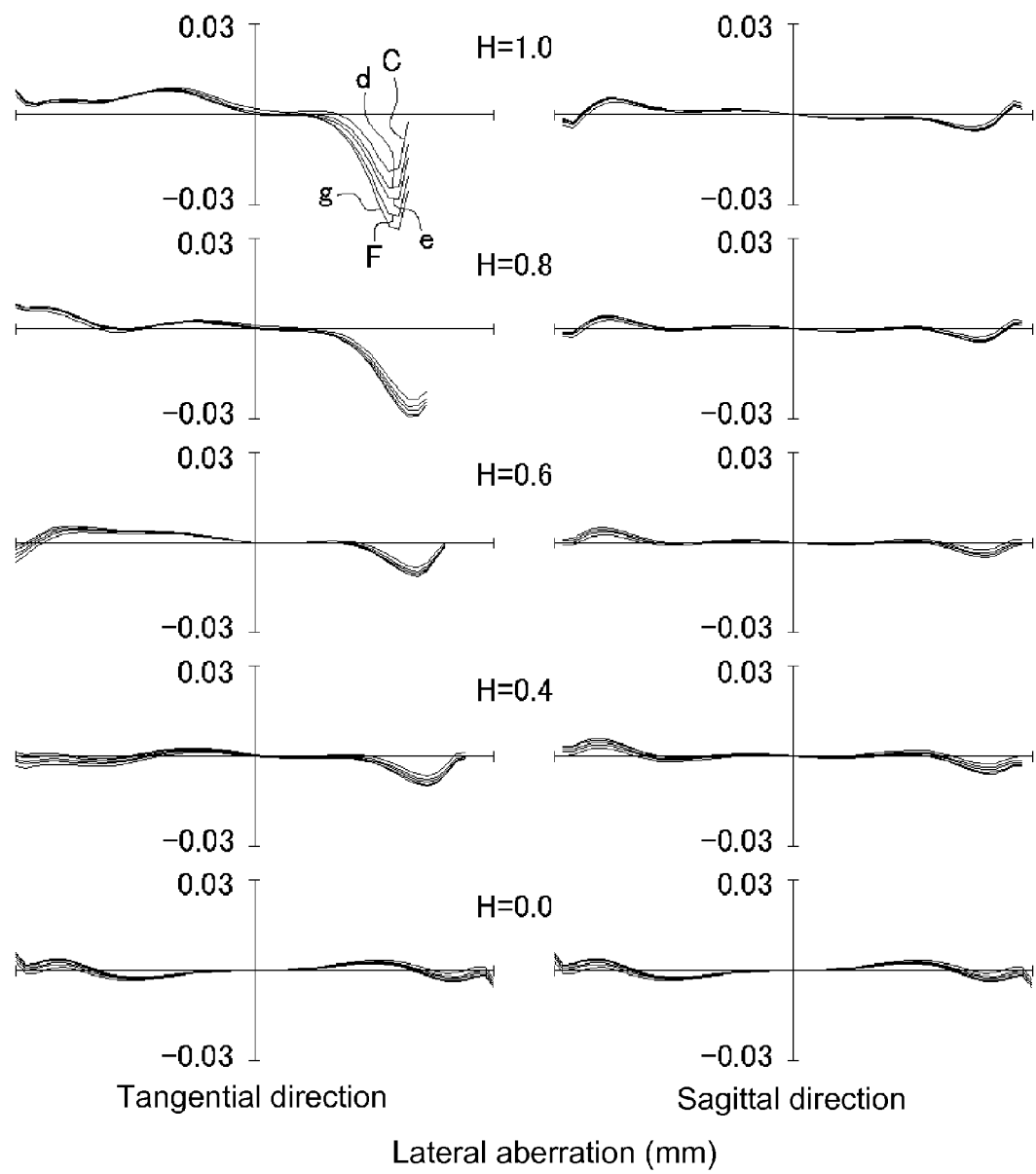
FIG. 14 is an aberration diagram showing a lateral aberration of the imaging lens of FIG. 13.
Figure 15:
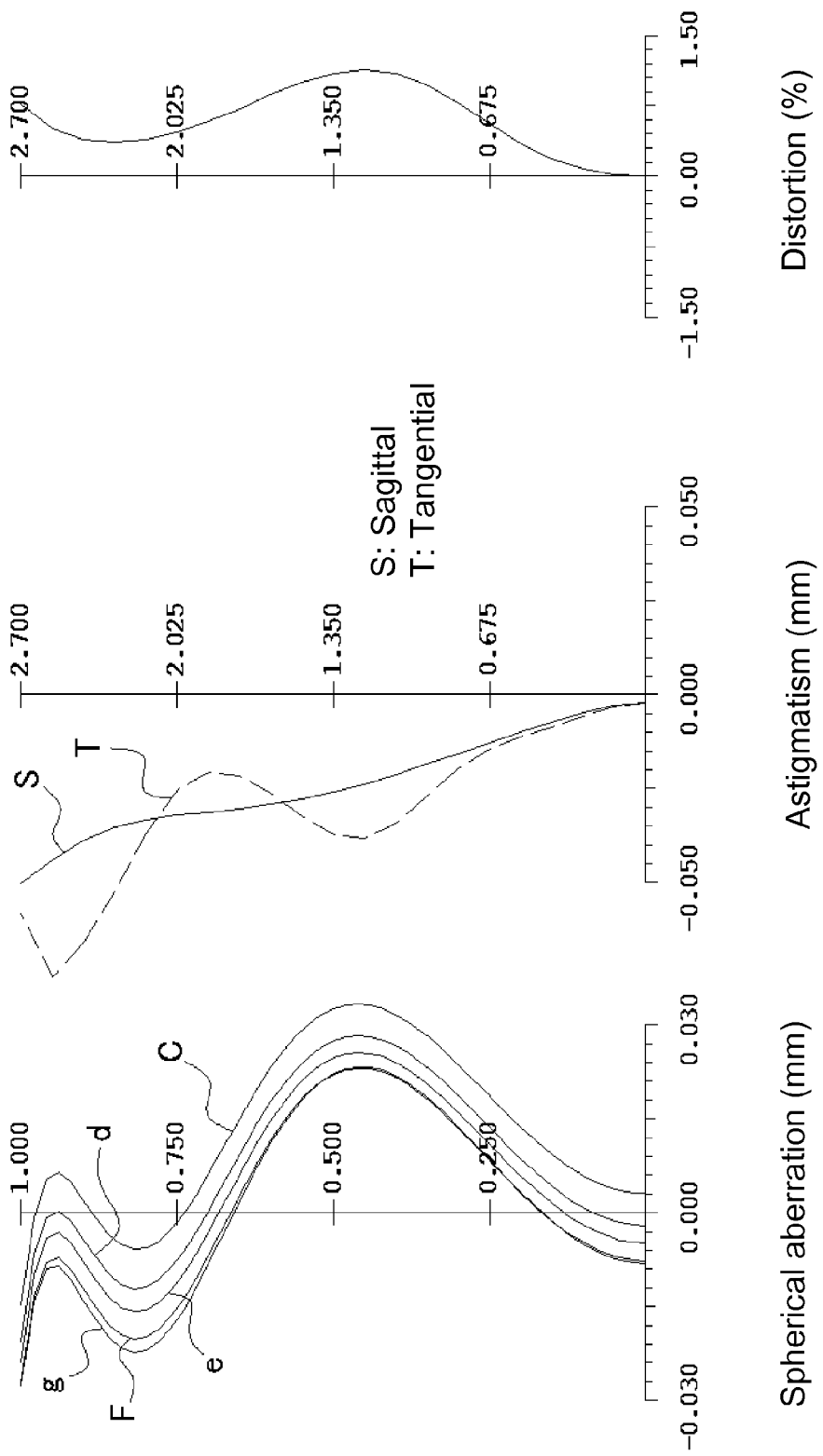
FIG. 15 is an aberration diagram showing a spherical aberration, an astigmatism, and a distortion of the imaging lens of FIG. 13
Figure 16:
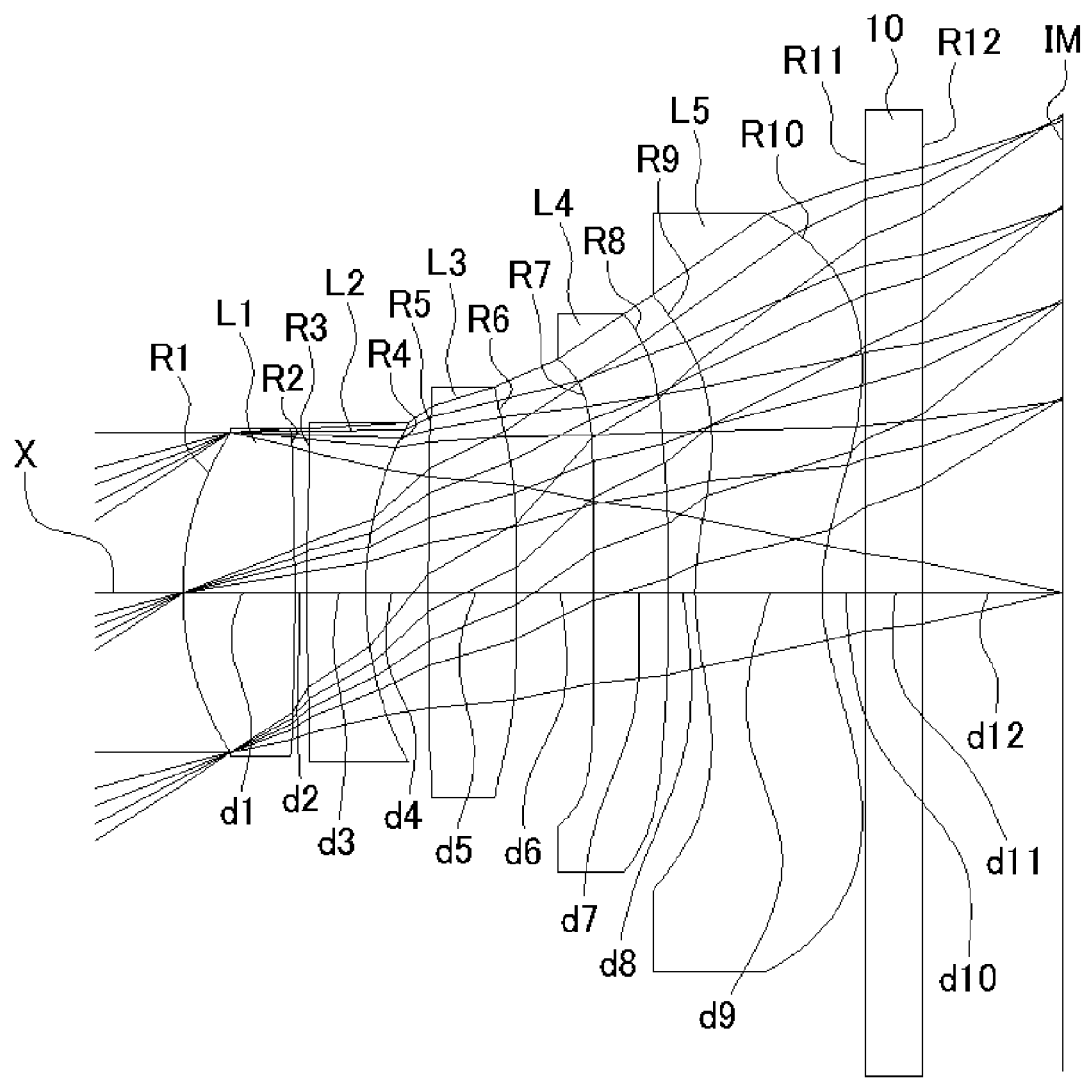
FIG. 16 is a schematic sectional view showing a configuration of an imaging lens in Numerical Data Example 6 according to an embodiment of the invention.

FIG. 14 shows the lateral aberration that corresponds to the image height ratio H in the imaging lens of Numerical Data Example 5. Furthermore, FIG. 15 shows a spherical aberration (mm), an astigmatism (mm), and a distortion (%), respectively. As shown in FIGS. 14 and 15, also with the imaging lens of this Numerical Data Example 5, the image surface is satisfactorily corrected and aberrations are suitably corrected, similarly to Numerical Data Example 1.

Numerical Data Example 6

Basic lens data are shown below.

$f = 3.979$ mm, Fno = 2.31, $\omega = 33.16°$
Unit: mm

Surface Data

| Surface Number i | R | d | Nd | vd |
|---|---|---|---|---|
| (Object) | ∞ | ∞ | | |
| 1* (Stop) | 1.590 | 0.600 | 1.5346 | 56.0(=vd1) |
| 2* | −16.560 | 0.060 | | |
| 3* | 8.436(=R2f) | 0.320 | 1.6142 | 26.0(=vd2) |
| 4* | 1.883(=R2r) | 0.335(=dA) | | |
| 5* | 10.292 | 0.473 | 1.5346 | 56.0(=vd3) |
| 6* | −167.773 | 0.415(=dB) | | |
| 7* | −15.454 | 0.400 | 1.6142 | 26.0(=vd4) |
| 8* | −17.008 | 0.141 | | |

-continued

| | f = 3.979 mm, Fno = 2.31, ω = 33.16° Unit: mm | | | |
|---|---|---|---|---|
| 9* | 1.471 | 0.682 | 1.5346 | 56.0 (=vd5) |
| 10* | 1.217 | 0.235 | | |
| 11 | ∞ | 0.300 | 1.5163 | 64.12 |
| 12 | ∞ | 0.753 | | |
| (Image Plane) | ∞ | | | |

$f1 = 2.745$ mm
$f2 = -4.022$ mm
$f3 = 18.155$ mm
$f4 = -305.302$ mm
$f5 = -205.163$ mm
$f34 = 19.440$ mm
$Z_{0.7} = 0.066$ mm
$L = 4.61$ mm

Aspheric Data

First Surface $k = 0.000$, $A_4 = -8.004E-04$, $A_6 = -8.196E-06$, $A_8 = 2.416E-02$,
$A_{10} = -2.586E-02$ Second Surface $k = 0.000$, $A_4 = -3.486E-02$, $A_6 = 2.044E-01$, $A_8 = -2.800E-01$,
$A_{10} = 9.556E-02$ Third Surface $k = 0.000$, $A_4 = -1.388E-01$, $A_6 = 3.993E-01$, $A_8 = -5.544E-01$,
$A_{10} = 2.433E-01$ Fourth Surface $k = 0.000$, $A_4 = -1.172E-01$, $A_6 = 3.061E-01$, $A_8 = -3.445E-01$,
$A_{10} = 1.675E-01$ Fifth Surface $k = 0.000$, $A_4 = -1.459E-01$, $A_6 = 1.994E-01$, $A_8 = -1.359E-01$,
$A_{10} = 5.642E-02$ Sixth Surface $k = 0.000$, $A_4 = -1.874E-01$, $A_6 = 2.176E-01$, $A_8 = -2.585E-01$,
$A_{10} = 1.688E-01$, $A_{12} = -1.241E-02$, $A_{14} = -3.692E-02$,
$A_{16} = 1.556E-02$ Seventh Surface $k = 0.000$, $A_4 = 1.025E-01$, $A_6 = -1.608E-01$, $A_8 = 8.611E-02$,
$A_{10} = -2.751E-02$, $A_{12} = -4.373E-03$, $A_{14} = 1.437E-03$,
$A_{16} = 2.803E-05$ Eighth Surface $k = 0.000$, $A_4 = -6.126E-02$, $A_6 = 1.017E-01$, $A_8 = -7.748E-02$,
$A_{10} = 2.308E-02$, $A_{12} = -3.258E-03$, $A_{14} = 1.012E-04$,
$A_{16} = 5.961E-05$ Ninth Surface $k = -3.380$, $A_4 = -3.407E-01$, $A_6 = 1.849E-01$, $A_8 = -4.941E-02$,
$A_{10} = -1.273E-04$, $A_{12} = 1.372E-03$, $A_{14} = 3.205E-04$,
$A_{16} = -8.787E-05$ Tenth Surface $k = -3.760$, $A_4 = -1.538E-01$, $A_6 = 6.762E-02$, $A_8 = -2.105E-02$,
$A_{10} = 3.332E-03$, $A_{12} = -2.907E-04$, $A_{14} = 2.443E-05$,
$A_{16} = -2.729E-06$ The values of the respective conditional expressions are as follows:

f2/f=−1.011
f1/f2=−0.682
R2f/R2r=4.480
f3/f=4.563
$Z_{0.7}$/f=0.01
f34/f=4.886
dA/dB=0.807

Accordingly, the imaging lens of this Numerical Data Example 6 satisfies the respective conditional expressions (1) to (15).

Figure 17:
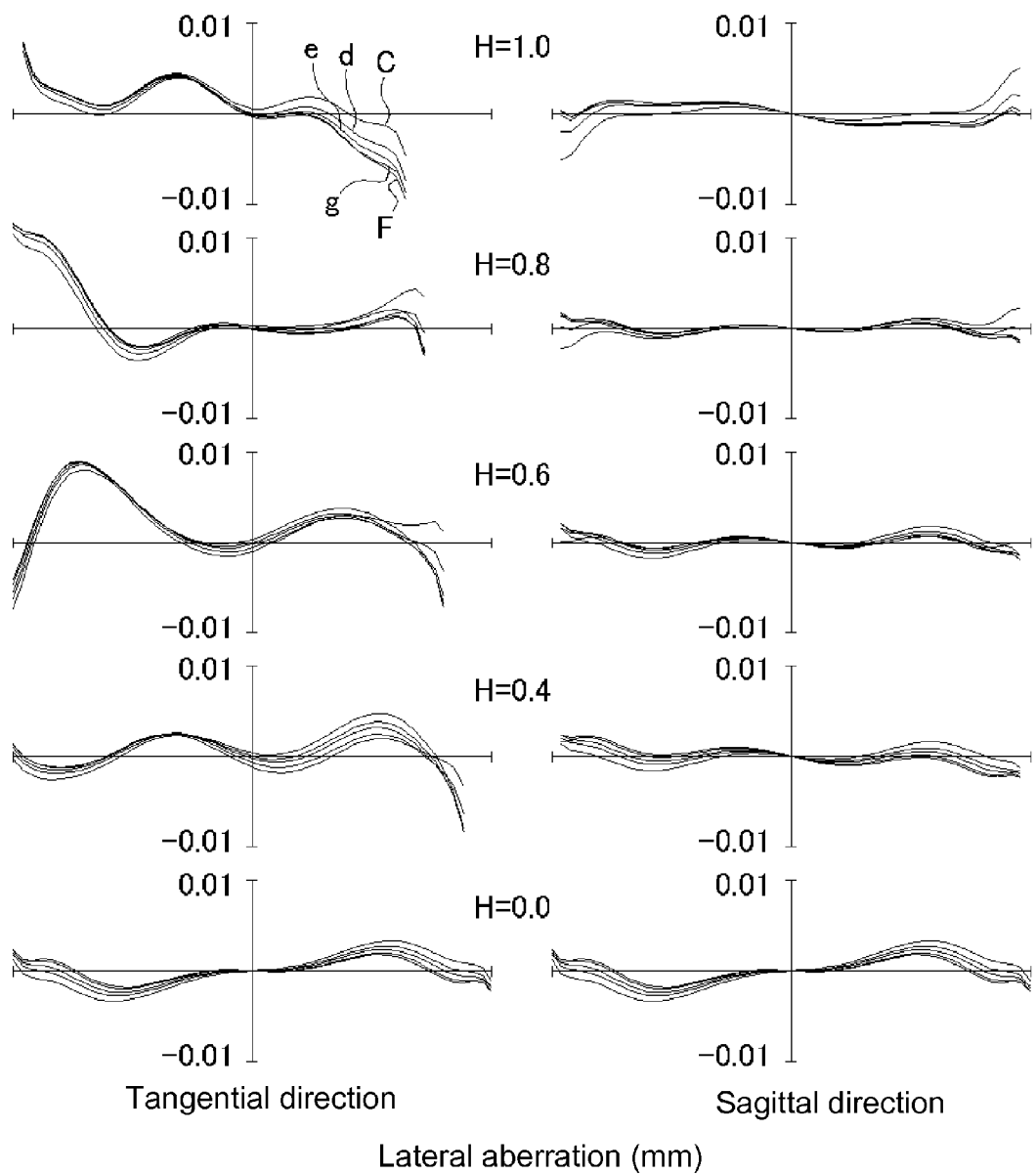
FIG. 17 is an aberration diagram showing a lateral aberration of the imaging lens of FIG. 16.
Figure 18:
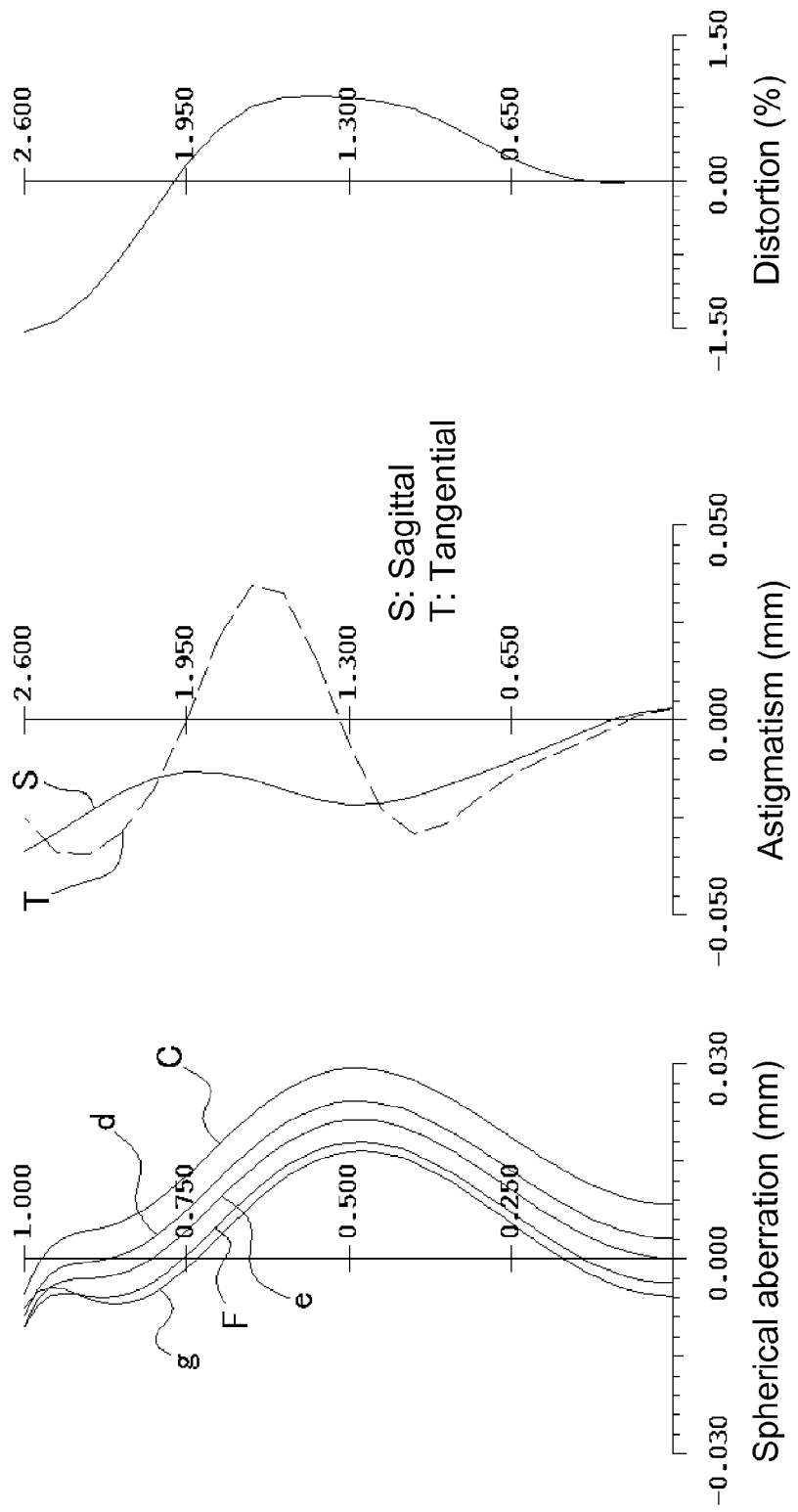
FIG. 18 is an aberration diagram showing a spherical aberration, an astigmatism, and a distortion of the imaging lens of FIG. 16.

FIG. 17 shows the lateral aberration that corresponds to the image height ratio H in the imaging lens of Numerical Data Example 6. Furthermore, FIG. 18 shows a spherical aberration (mm), an astigmatism (mm), and a distortion (%), respectively. As shown in FIGS. 17 and 18, also with the imaging lens of this Numerical Data Example 6, the image surface is satisfactorily corrected and aberrations are suitably corrected, similarly to Numerical Data Example 1.

Accordingly, when the imaging lens of the respective embodiments are applied to an imaging optical system of a cellular phone, a digital still camera, a portable information terminal, a security camera, a vehicle onboard camera, a network camera, and the like, it is possible to attain both high performances and miniaturization of such cameras.

Here, the imaging lens of the invention is not limited to the above-described embodiments. While all surfaces of the first lens L1 to the fifth lens L5 are formed as aspheric surfaces in the above-described embodiments, it is not necessary to form all the surfaces as aspheric surfaces. It is possible to form one or both of the lens surfaces of the first lens L1 to the fifth lens L5 as spherical surfaces.

The invention is applicable to an imaging lens for mounting in a device that requires a small size and satisfactory aberration correction ability as an imaging lens, for example, a cellular phone or a digital still camera.

The disclosure of Japanese Patent Application No. 2011-143711, filed on Jun. 29, 2011 is incorporated in the application by reference.

While the invention has been explained with reference to the specific embodiments of the invention, the explanation is illustrative and the invention is limited only by the appended claims.

What is claimed is:

1. An imaging lens comprising:
   a first lens having positive refractive power;
   a second lens having negative refractive power;
   a third lens having positive refractive power;
   a fourth lens having negative refractive power; and
   a fifth lens having object-side and image plane-side surfaces thereof being aspheric, arranged in this order from an object side to an image plane side,
   wherein said first lens has a shape so that a curvature radius of a surface thereof on the object side is positive,
   said fifth lens has a shape so that a curvature radius of the surface thereof on the object side and a curvature radius of the surface thereof on the image plane side are positive, and
   said second lens, said third lens, and said fourth lens are arranged so that the following conditional expression is satisfied:

$0.3 < dA/dB < 2.0$ where dA is a distance on an optical axis from a surface of the second lens on the image plane side to a surface of the third lens on the object side, and dB is a distance on the optical axis from a surface of the third lens on the image plane side to a surface of the fourth lens on the object side.

2. The imaging lens according to claim 1, wherein said fifth lens has negative refractive power.

3. The imaging lens according to claim 1, wherein said first lens has a focal length f1, said second lens has a focal length f2, said third lens has a focal length f3, said fourth lens has a focal length f4, and said fifth lens has a focal length f5 so that the following conditional expressions are satisfied:

$f1 < f3$ $|f2| < f3$ $f3 < |f4|$ $|f2| < |f5|$.

4. The imaging lens according to claim 1, wherein said second lens has a shape so that a curvature radius of a surface thereof on the object side and a curvature radius of the surface thereof on the image plane side are positive, and said third lens has a shape so that a curvature radius of the surface thereof on the object side is positive.

5. The imaging lens according to claim 1, wherein said first lens has an Abbe's, number vd1, said second lens has an Abbe's number vd2, said third lens has an Abbe's number vd3, said fourth lens has an Abbe's number vd4, and said fifth lens has an Abbe's number vd5 so that the following conditional expressions are satisfied:

$4.5 < vd1 < 85$ $\mu d2 < 35$ $45 < vd3 < 85$ $vd4 < 35$ $4.5 < vd5 < 85$.

6. The imaging lens according to claim 1, wherein said second lens has a focal length f2 so that the following conditional expression is satisfied:

$-1.5 < f2/f < -0.4$ where f is a focal length of a whole lens system.

7. The imaging lens according to claim 1, wherein said first lens has a focal length f1 and said second lens has a focal length f2 so that the following conditional expression is satisfied:

$-1.0 < f1/f2 < -0.5$.

8. The imaging lens according to claim 1, wherein said second lens has a shape so that a surface thereof on the object side has a curvature radius R2f and a surface thereof on the image plane side has a curvature radius R2r so that the following conditional expression is satisfied:

$3.0 < R2f/R2r < 6.0$.

9. The imaging lens according to claim 1, wherein said third lens has a focal length f3 so that the following conditional expression is satisfied:

$3.0 < f3/f < 7.0$ where f is a focal length of a whole lens system.

10. The imaging lens according to claim 1, wherein said third lens has a shape so that a surface thereof on the object side has a maximum effective diameter $\phi_{3A}$ and a surface thereof on the image plane side has a maximum effective diameter $\phi_{3B}$, and
    said fourth lens has a shape so that a surface thereof on the object side has a maximum effective diameter $\phi_{4A}$ and a surface thereof on the image plane side has a maximum effective diameter $\phi_{4B}$ so that the following conditional expression is satisfied:

$Z_{0.7}/f < 0.1$ where $Z_{0.7}$ is an absolute value of a maximum sag up to 70% of the maximum effective diameters $\phi_{3A}$ to $\phi_{4B}$, and f is a focal length of a whole lens system.

11. The imaging lens according to claim 1, wherein said third lens and said fourth lens have a composite focal length f34 so that the following conditional expression is satisfied:

$2.0 < f34/f < 10.0$ where f is a focal length of a whole lens system.

12. An imaging lens comprising:
    a first lens having positive refractive power;
    a second lens having negative refractive power;
    a third lens having aspheric surfaces;
    a fourth lens having negative refractive power; and a fifth lens having aspheric surfaces, arranged in this order from an object side to an image plane side,
wherein said first lens has a shape so that a curvature radius of a surface thereof on the object side is positive,
said second lens has a shape so that a curvature radius of a surface thereof on the object side and a curvature radius of a surface thereof on the image plane side are positive,
said third lens has a shape so that a curvature radius of a surface thereof on the object side is positive,
said fourth lens has a shape so that a curvature radius of a surface thereof on the object side and a curvature radius of a surface thereof on the image plane side are negative.

13. The imaging lens according to claim 12, wherein said third lens has positive refractive power, and
said fifth lens has negative refractive power.

14. The imaging lens according to claim 12, wherein said fifth lens has a shape so that a curvature radius of a surface thereof on the object side and a curvature radius of a surface thereof on the image plane side are positive.

15. The imaging lens according to claim 12, wherein said first lens has a focal length f1, said second lens has a focal length f2, said third lens has a focal length f3, said fourth lens has a focal length f4, and said fifth lens has a focal length f5 so that the following conditional expressions are satisfied:

$$f1 < f3$$

$$|f2| < f3$$

$$f3 < |f4|$$

$$|f2| < |f5|.$$

16. The imaging lens according to claim 12, wherein said first lens has an Abbe's number vd1, said second lens has an Abbe's number vd2, said third lens has an Abbe's number vd3, said fourth lens has an Abbe's number vd4, and said fifth lens has an Abbe's number vd5 so that the following conditional expressions are satisfied:

$$45 < vd1 < 85$$

$$vd2 < 35$$

$$45 < vd3 < 85$$

$$vd4 < 35$$

$$45 < vd5 < 85.$$

17. The imaging lens according to claim 12, wherein said second lens has a focal length f2 so that the following conditional expression is satisfied:

$$-1.5 < f2/f < -0.4.$$

where f is a focal length of a whole lens system.

18. The imaging lens according to claim 12, wherein said first lens has a focal length f1 and said second lens has a focal length f2 so that the following conditional expression is satisfied:

$$-1.0 < f1/f2 < -0.5.$$

19. The imaging lens according to claim 12, wherein said second lens has the shape so that the surface thereof on the object side has the curvature radius R2f and the surface thereof on the image plane side has the curvature radius R2r so that the following conditional expression is satisfied:

$$3.0 < R2f/R2r < 6.0.$$

20. The imaging lens according to claim 12, wherein said third lens has a focal length f3 so that the following conditional expression is satisfied:

$$3.0 < f3/f < 7.0$$

where f is a focal length of a whole lens system.

21. The imaging lens according to claim 12, wherein said third lens has the shape so that the surface thereof on the object side has a maximum effective diameter $\phi_{3A}$ and a surface thereof on the image plane side has a maximum effective diameter $\phi_{3B}$, and
said fourth lens has the shape so that the surface thereof on the object side has a maximum effective diameter $\phi_{4A}$ and the surface thereof on the image plane side has a maximum effective diameter $\phi_{4B}$ so that the following conditional expression is satisfied:

$$Z_{0.7}/f < 0.1$$

where $Z_{0.7}$ is an absolute value of a maximum sag up to 70% of the maximum effective diameters $\phi_{3A}$ to $\phi_{4B}$, and f is a focal length of a whole lens system.

22. The imaging lens according to claim 12, wherein said third lens and said fourth lens have a composite focal length f34 so that the following conditional expression is satisfied:

$$2.0 < f34/f < 10.0.$$

where f is a focal length of a whole lens system.

23. The imaging lens according to claim 12, wherein said second lens, said third lens, and said fourth lens are arranged so that the following conditional expression is satisfied:

$$0.3 < dA/dB < 2.0$$

where dA is a distance on an optical axis from the surface of the second lens on the image plane side to the surface of the third lens on the object side, and dB is a distance on the optical axis from a surface of the third lens on the image plane side to the surface of the fourth lens on the object side.

* * * * *